(12) United States Patent
Perego et al.

(10) Patent No.: US 12,488,908 B2
(45) Date of Patent: Dec. 2, 2025

(54) ELECTRICAL CABLE OR ELECTRICAL CABLE ACCESSORY

(71) Applicant: NEXANS, Courbevoie (FR)

(72) Inventors: Gabriele Perego, Milan (IT); Jihane Sahyoun, Villeurbanne (FR); Christian Koelblin, Meximieux (FR); Massimiliano Mauri, Borgenhaugen (NO)

(73) Assignee: NEXANS, Courbevoie (FR)

( * ) Notice: Subject to any disclaimer, the term of this patent is extended or adjusted under 35 U.S.C. 154(b) by 193 days.

(21) Appl. No.: 18/085,463

(22) Filed: Dec. 20, 2022

(65) Prior Publication Data
US 2023/0260671 A1  Aug. 17, 2023

(30) Foreign Application Priority Data

Dec. 21, 2021 (EP) ..................................... 21306881

(51) Int. Cl.
| | |
|---|---|
| *H01B 7/29* | (2006.01) |
| *C08J 3/24* | (2006.01) |
| *C08J 5/18* | (2006.01) |
| *C08J 7/04* | (2020.01) |
| *C08K 3/04* | (2006.01) |

(Continued)

(52) U.S. Cl.
CPC ............... *H01B 1/124* (2013.01); *C08J 3/24* (2013.01); *C08J 5/18* (2013.01); *C08J 7/0427* (2020.01); *C08K 3/04* (2013.01); *C08K 5/175* (2013.01); *H01B 3/30* (2013.01); *C08J 2323/08* (2013.01);

(Continued)

(58) Field of Classification Search
CPC . H01B 1/12; H01B 1/18; H01B 1/124; H01B 3/08; H01B 3/22; H01B 3/30; H01B 3/40; H01B 3/441; H01B 3/447; H01B 7/28; H01B 7/29; H01B 7/292; H01B 13/145; H01B 13/148; C08J 3/04; C08J 3/24; C08J 5/24; C08J 5/175; C08J 5/18; C08J 7/0427; C08K 3/22; C08K 3/346; C08K 5/132; C08K 13/02; H01R 4/10; C08L 23/06; C08L 23/12; C08L 23/14
USPC ............... 174/74 R, 78, 84 R, 110 R, 120 R, 174/120 SC; 525/100; 428/375, 383
See application file for complete search history.

(56) References Cited

U.S. PATENT DOCUMENTS

| | | | | |
|---|---|---|---|---|
| 4,312,793 A | * | 1/1982 | Charneski | H01R 3/08 252/519.31 |
| 7,923,500 B2 | * | 4/2011 | Siegel | H02G 15/105 524/430 |

(Continued)

FOREIGN PATENT DOCUMENTS

| | | | | |
|---|---|---|---|---|
| EP | 0 750 319 A1 | * | 12/1996 | ............... H01B 7/28 |
| EP | 2 444 455 A1 | * | 4/2012 | ............... C08K 3/04 |
| JP | H06 116362 | | 4/1994 | |

OTHER PUBLICATIONS

International Search Report dated Jun. 8, 2022.

*Primary Examiner* — William H. Mayo, III
(74) *Attorney, Agent, or Firm* — MUNCY, GEISSLER, OLDS & LOWE, P.C.

(57) ABSTRACT

An electrical cable or electrical cable accessory includes at least one semiconductor layer, and at least one electrically insulating layer, at least partially in direct contact with the semiconductor layer. The electrically insulating layer is obtained from an insulating polymer composition having a thermoplastic polymer material, and the semiconductor layer is at least partially crosslinked.

29 Claims, 2 Drawing Sheets

(51) Int. Cl.
  *C08K 5/17* (2006.01)
  *H01B 1/12* (2006.01)
  *H01B 3/30* (2006.01)

(52) U.S. Cl.
  CPC ..... *C08J 2323/14* (2013.01); *C08K 2201/001* (2013.01)

(56) References Cited

U.S. PATENT DOCUMENTS

| | | | |
|---|---|---|---|
| 10,755,832 B2* | 8/2020 | Perego | C08L 23/14 |
| 2003/0032728 A1* | 2/2003 | Arhart | C08F 8/42 |
| | | | 525/100 |
| 2008/0128939 A1* | 6/2008 | Dell' Anna | H01B 13/143 |
| | | | 264/104 |
| 2010/0025073 A1* | 2/2010 | Fagrell | C09D 5/20 |
| | | | 264/105 |
| 2010/0179299 A1* | 7/2010 | Wittenbecher | C08G 59/686 |
| | | | 528/94 |
| 2010/0206607 A1* | 8/2010 | Noyens | B82Y 10/00 |
| | | | 252/511 |
| 2011/0240330 A1* | 10/2011 | Gervat | C08L 23/0884 |
| | | | 252/511 |
| 2012/0212904 A1* | 8/2012 | Fleming | H01B 1/18 |
| | | | 174/254 |
| 2013/0206453 A1* | 8/2013 | Fagrell | H01B 3/441 |
| | | | 252/511 |
| 2013/0220666 A1* | 8/2013 | Fagrell | C08K 5/42 |
| | | | 174/120 SR |
| 2014/0309337 A1* | 10/2014 | Nagano | C08G 59/5033 |
| | | | 523/428 |
| 2014/0363671 A1* | 12/2014 | Alric | H01B 7/2813 |
| | | | 428/383 |
| 2015/0004411 A1* | 1/2015 | Malik | H01B 13/24 |
| | | | 252/511 |
| 2015/0279513 A1* | 10/2015 | Koelblin | H01B 3/447 |
| | | | 174/110 SR |
| 2016/0125975 A1* | 5/2016 | Briceno Garcia | H01B 3/40 |
| | | | 174/84 R |
| 2017/0263348 A1* | 9/2017 | Combessis | H01B 3/447 |
| 2018/0016429 A1* | 1/2018 | Lee | H01B 3/441 |
| 2020/0005961 A1* | 1/2020 | Perego | C08F 210/06 |
| 2020/0399421 A1* | 12/2020 | Malheurty | H01B 13/148 |

* cited by examiner

ELECTRICAL CABLE OR ELECTRICAL CABLE ACCESSORY

RELATED APPLICATION

This application claims the benefit of priority from European Patent Application No. 21 306 881.0, filed on Dec. 21, 2021, the entirety of which is incorporated by reference.

FIELD OF THE INVENTION

The present invention relates to the field of electrical cables and electrical cable accessories, such as cable terminations and cable joints, notably flexible joints. It is particularly interested in an electrical cable and an electrical cable accessory, in a system comprising said cable and/or said cable accessory and in a method for manufacturing said cable and said cable accessory.

The present invention applies typically, but not exclusively, to the field of cables intended for the transport of energy, in particular to high or very high voltage power cables (in particular greater than 60 kV, and preferably from 320 up to 800 kV), whether in direct or alternating current, in the fields of air, submarine, terrestrial electricity transport, or even aeronautics. More specifically, the present invention applies to the field of cable accessories such as cable joints, in particular high voltage direct current joints (HVDC joints) or high voltage alternating current joints (HVAC joints), notably for submarine applications.

DESCRIPTION OF RELATED ART

It is known to use electrical cables comprising polymer layers based on crosslinked polyethylene (XLPE). The crosslinking of polyethylene enables to improve electrical and mechanical properties, in particular to ensure dimensional stability under high temperatures, to prevent stress cracking, and to improve the resistance towards chemicals of these polymer layers. As a result, XLPE cables can be operated up to 90° C. in continuous use while cables comprising non crosslinked polyethylene (LDPE) cannot exceed 70° C. in continuous use.

The crosslinking is typically carried out with a crosslinking agent, usually a peroxide, which however results in unwanted by-products entrapped within the crosslinked polyethylene layer. For instance, dicumyl peroxide (DCP), a commonly used crosslinking agent in the field of cables, gives place to methane, water, acetophenone and cumyl alcohol, which affect the electrical properties of the cable. Therefore, these unwanted by-products must be removed from the crosslinked polyethylene layer, which typically involves a time (usually form 15 days to about 2 months, depending on the cable dimensions) and energy intensive degassing step at elevated temperature (usually about 70-80° C.) to cause migration and subsequent evaporation of the unwanted by-products from the cable.

Moreover, crosslinked polyethylene cannot be easily recycled using conventional technologies.

Recently, cables comprising non-crosslinked polymer layers have been developed as alternative to conventional cables comprising crosslinked polymer layers (i.e., XLPE cables).

Such cables comprise non-crosslinked polymer layers based on thermoplastic polymer material.

Such electrical cables typically comprise an elongated electrical conductor and a thermoplastic insulation system surrounding the electrical conductor. The thermoplastic insulation system typically comprises an inner thermoplastic semiconducting layer, a thermoplastic electrically insulating layer and an outer thermoplastic outer layer.

Electrical cable accessories are used in an energy network to restore the insulation and electric field control over a cable portion where the conductor was exposed, such as in case of connection between two electrical cables or between an electrical cable and another network component, such as a transformer, a generator, a bare conductor of an overhead line or the like. Cable accessories include cable joints and cable terminations.

Some technical problems have been identified for the specific development of cable accessories intended to such electrical cables comprising a thermoplastic insulation system.

For instance, flexible cable joints, also known as factory joints, require to be finished with an outer diameter which is strictly identical to the outer diameter of the cable itself to fulfil the cable handling requirements of the manufacturing line.

Accordingly, the flexible joints require the reconstruction of the thermoplastic insulation system of the electrical cable, namely the reconstruction of the inner thermoplastic semiconducting layer, followed by the reconstruction of the thermoplastic electrically insulating layer and at the end the reconstruction of the outer thermoplastic outer layer.

For example, EP3365952 discloses a thermoplastic electrical cable joint for joining cables with thermoplastic insulation system.

However, compared to flexible joints comprising crosslinked inner semiconducting and electrically insulating layers, it has been observed by the inventors that, in flexible joints comprising thermoplastic inner semiconducting and electrically insulating layers, such as the cable joint described in EP3365952, the reconstruction of the electrically insulating layer can much more easily damage the surface of the inner thermoplastic semiconducting layer of the flexible joint.

In particular, the inner thermoplastic semiconducting layer is subjected to deformation during the reconstruction of the electrically insulating layer. This is notably because local partial melting of the inner thermoplastic semiconducting layer occurs once the electrically insulating layer is applied in the molten state at its surface.

As a result, significant defects are created at the interface between the inner thermoplastic semiconducting layer and the thermoplastic electrically insulating layer of the flexible joint which has detrimental effects on its electrical properties and reliability.

Accordingly, there is a need for improving electrical cables and electrical cable accessories comprising a thermoplastic electrically insulating layer, such as the cable joint described in EP3365952, in particular to improve their electrical performance and reliability.

Objects and Summary:

A subject matter of the present invention is an electrical cable or electrical cable accessory, comprising:
- at least one semiconducting layer, and
- at least one electrically insulating layer, at least partially in direct contact with the semiconducting layer, and notably surrounding the semiconducting layer, wherein the electrically insulating layer is obtained from an insulating polymer composition comprising a thermoplastic polymer material, and wherein the semiconducting layer is at least partially crosslinked.

Despite the recent trend which consists of replacing crosslinked layers by non-crosslinked layers, namely thermoplastic polymer layers, because of the drawbacks mentioned above regarding conventional XLPE cables, it was now surprisingly found in the context of the present invention that the use of a semiconducting layer that is at least partially crosslinked enables to significantly improve the performance of electrical cables and cable accessories comprising a thermoplastic electrically insulating layer, such as the joint described in EP3365952.

For example, the deformation of the semiconducting layer during the reconstruction of the thermoplastic electrically insulating layer which was observed in the joint of the prior art, such as the one disclosed in EP3365952, is significantly limited and even precluded thanks to the presence of the at least partially crosslinking of the semiconducting layer.

The interface between the semiconducting layer and the thermoplastic electrically insulating layer according to the present invention is significantly improved which allows the electrical cable or electrical cable accessory of the present invention to have improved electrical properties and reliability. In particular, the electrical cable accessory of the present invention have better electrical properties and higher reliability compared to the joint of the prior art, such as the one disclosed in EP3365952.

Preferably, the semiconducting layer is obtained from a crosslinkable semiconducting polymer composition substantially free of peroxides, azides and/or other free radical initiators.

As mentioned above, the crosslinking is conventionally carried out with a peroxide. However, in the context of the present invention, the inventors propose the use of a semiconducting layer that is at least partially crosslinked, preferably without making use of peroxide, azide and/or other free radical initiator, which reveals to further improve the interface between the semiconducting layer and the electrically insulating layer, and notably the reconstruction of the thermoplastic electrically insulating layer in case of a flexible joint, while avoiding the unwanted by-products generated with peroxide crosslinking and the subsequent degassing step, as mentioned above.

Moreover, the use of a crosslinkable semiconducting polymer composition substantially free of peroxides, azides and/or other free radical initiators may be advantageous because when the crosslinkable semiconducting polymer composition is extruded, the temperature used during the extrusion process is no longer limited by the peroxide decomposition temperature. This means that it may be possible to extrude the semiconducting layer, and therefore to obtain a non-crosslinked extruded semiconducting layer, without worrying for the peroxide decomposition to take place in the extruder. For example, the extrusion of a crosslinkable semiconducting polymer composition containing DCP should be carried out below 150° C. in order to avoid DCP decomposition in the extruder because DCP decomposes at 150° C. This is particularly interesting if the crosslinkable semiconducting polymer composition comprises high melting temperature polymer materials.

In the present description, "substantially free" with regard to the amount of peroxides, azides and/or other free radical initiators in the crosslinkable semiconducting polymer composition is defined to mean that the crosslinkable semiconducting polymer composition does not comprise any peroxide, azide and/or other free radical initiator or alternatively that it comprises peroxides, azides and/or other free radical initiators in a total quantity that is sufficiently low so as to minimize or avoid the above mentioned drawbacks when using peroxides as crosslinking agent, and in particular to not affect the structural properties of the thermoplastic electrically insulating layer, i.e. a total quantity that is typically less than 2%, preferably less than 1%, more preferably less than 0.5%, and even more preferably less than 0.2%, by weight, with respect to the total weight of the crosslinkable semiconducting polymer composition.

Typically, the crosslinkable semiconducting polymer composition is substantially free from peroxides having formula $R_1$—O—O—$R_2$, wherein $R_1$ and $R_2$, equal or different from each other, are linear or branched alkyls $C_1$-$C_{18}$, aryls $C_6$-$C_{12}$, alkylaryls or arylalkyls $C_7$-$C_{24}$, such as dicumyl peroxide, t-butyl cumyl peroxide, 2,5-dimethyl-2,5-di(t-butyl peroxy)hexane, di-t-butyl peroxide, or mixtures thereof. This means that typically, the crosslinkable semiconducting polymer composition does not comprise the above mentioned peroxides, or alternatively, comprises less than 2%, preferably less than 1%, more preferably less than 0.5%, and even more preferably less than 0.2% by weight of the above mentioned peroxides, with respect to the total weight of the crosslinkable semiconducting polymer composition.

The electrically insulating layer of the present invention is a non-crosslinked layer or, in other words, a thermoplastic layer.

In the present description, the terms "non-crosslinked layer" or "thermoplastic layer" are synonymous and mean a layer whose gel rate according to ASTM D2765-01 (xylene extraction) is at most about 20%, preferably at most about 15%, particularly preferably at most about 10%, more particularly preferably at most about 5%, and even more particularly preferably 0%.

The semiconducting layer that is at least partially crosslinked can be easily characterized by the determination of its gel content according to ASTM D2765-01 (xylene extraction). More particularly, said semiconducting layer can advantageously have a gel content, according to ASTM D2765-01 (xylene extraction), of at least 20%, preferably of at least 30%, for example of at least 40%, 50%, 60%, 70%, 80% or 90%.

In the present description, "semiconductive layer" means a layer whose electrical conductivity can be strictly greater than $1 \cdot 10^{-9}$ S/m (siemens per meter), preferably at least $1 \cdot 10^{-3}$ S/m, and preferably can be less than $1 \cdot 10^{3}$ S/m (measured at 25° C. in direct current).

In the present description, "electrically insulating layer" means a layer whose electrical conductivity cannot exceed $1 \cdot 10^{-9}$ S/m (siemens per meter), and preferably not more than $1 \cdot 10^{-10}$ S/m (measured at 25° C. in direct current).

The electrically insulating layer has more particularly a lower electrical conductivity than the semi-conductive layer. More particularly, the electrical conductivity of the semi-conductive layer can be at least 10 times higher than the electrical conductivity of the electrically insulating layer, preferably at least 100 times higher than the electrical conductivity of the electrically insulating layer, and particularly preferably at least 1000 times higher than the electrical conductivity of the electrically insulating layer.

Electrical Cable

The electrical cable according to the present invention may comprise at least one elongated electrical conductor. The semiconducting layer of the cable may surround said elongated electrical conductor and the electrically insulating layer of the cable may surround the semiconducting layer of the cable.

The electrical cable according to the present invention may be a high voltage direct or alternating current cable, for example from 320 kV up to 800 kV.

The electrical cable may be a subsea electrical cable.

The semiconducting layer of the cable may be an extruded layer.

The electrically insulating layer of the cable may be an extruded layer.

Electrical Cable Accessory

The electrical cable accessory according to the present invention may be a high voltage direct or alternating current accessory (HVDC or HVAC accessory).

The electrical cable accessory may be intended to surround at least one part or end of at least one electrical cable.

The electrical cable accessory according to the present invention may be an electrical cable joint.

The electrical cable joint may enable the connection between two electrical cables, or even between three or more electrical cables.

The semiconducting layer of the cable joint may be intended to surround an electrical connector which electrically connects a first electrical cable end of a first electrical cable and a second electrical cable end of a second electrical cable.

Alternatively, the semiconducting layer of the cable joint may be intended to surround an electrical conductor joint formed by joining a terminal portion of an elongated electrical conductor of a first electrical cable with a terminal portion of an elongated electrical conductor of a second electrical cable placed axially adjacent to the first electric cable.

The electrical conductor joint can be obtained, for example, through a compression clamp if the elongated electrical conductors of the first and second electrical cables are made of copper, or through metal inert gas (MIG) welding if the elongated electrical conductors elongated electrical conductors of the first and second electrical cables are made of aluminum.

Preferably, the semiconducting layer of the cable joint is directly in contact with the electrical connector or electrical conductor joint.

The electrically insulating layer of the cable joint may be intended to surround the semiconducting layer of the cable joint.

In particular, the cable joint may be a flexible joint (also known as factory joint or diameter joint).

A flexible joint has typically an outer diameter which is strictly identical or slightly larger than the outer diameter of the joined cables, differently from the pre-molded joints which inevitably have a diameter remarkably larger than the outer diameters of the joined cables. This allows an easier handling of the joined cables, especially when the joined cables are to be wound over a reel and then unwound for installation.

The electrical cable accessory according to the present invention may be an electrical cable termination.

The electrical cable termination may enable the connection between an electrical cable and another network component, such as a transformer, a generator, a bare conductor of an overhead line or the like.

The cable termination, in particular the semiconducting and electrically insulating layers of the cable termination, may be intended to surround at least one end of an electrical cable.

In particular, the semiconducting and electrically insulating layers of the cable termination may be intended to surround, and preferably to be in contact with, the electrically insulating layer of the electrical cable.

The semiconducting layer of the cable termination may be a stress-relief cone of the cable termination. In this case, the cable termination comprises an electrically insulating layer according to the present invention and a stress-relief cone made with the semiconducting layer according to the present invention.

The electrical cables joined with the cable joint according to the present invention or terminated with the cable termination according to the present invention may comprise at least one elongated electrical conductor, at least one semiconducting layer surrounding said elongated electrical conductor and at least one electrically insulating layer surrounding the semiconducting layer.

Optionally, these electrical cables may comprise an additional semiconducting layer surrounding the electrically insulating layer. In this case, the semiconducting layer surrounding the elongated electrical conductor is called "inner semiconducting layer" and the additional semiconducting layer surrounding the electrically insulating layer is called "outer semiconducting layer".

In a particular embodiment, in these electrical cables, the semiconducting layer is in direct contact with the elongated electrical conductor, the electrically insulating layer is in direct contact with the semiconducting layer, and the additional semiconducting layer is in direct contact with the electrically insulating layer.

Preferably, at least the electrically insulating layer of these electrical cables is a thermoplastic layer obtained from an insulating polymer composition according to the present invention. In particular, the insulating polymer composition comprises a polypropylene-based thermoplastic material.

Alternatively, the electrically insulating layer of these cables is a crosslinked layer.

Preferably, the semiconducting layer of these cables is a at least partially crosslinked layer according to the present invention.

Alternatively, the semiconducting layer of these cables is a thermoplastic layer obtained from a semiconducting polymer composition comprising a thermoplastic polymer material, preferably a polypropylene-based thermoplastic material.

The electrically insulating layers of these electrical cables and the electrically insulating layer of the cable accessory according to the invention are preferably obtained from the same insulating polymer composition. This can ensure a good adhesion between the electrically insulating layers of these electrical cables and the electrically insulating layer of the cable accessory.

The semiconducting layers of these electrical cables and the semiconducting layer of the cable accessory according to the invention are preferably obtained from the same semiconducting polymer composition. This can ensure a good adhesion between the semiconducting layers of these electrical cables and the semiconducting layer of the cable accessory.

Additional Semiconducting Layer

The cable or cable accessory according to the present invention may comprise an additional semiconducting layer surrounding the electrically insulating layer. In this case, the additional semiconducting layer is called the "outer" semiconducting layer and the semiconducting layer according to the present invention is called the "inner" semiconducting layer.

In the case of a cable, the additional semiconducting layer (i.e. outer semiconducting layer) may surround the electrically insulating layer of the cable.

The outer semiconductive layer of the cable may be an extruded layer.

In a particular embodiment, in the case of a cable, the inner semiconducting layer is in direct contact with the elongated electrical conductor, the electrically insulating layer is in direct contact with the semiconducting layer, and the outer semiconducting layer is in direct contact with the electrically insulating layer.

The outer semiconductive layer of the cable or cable accessory may be obtained from a semiconducting polymer composition comprising polyethylene, notably high-density polyethylene (HDPE), medium-density polyethylene (MDPE) and low-density polyethylene (LDPE), polypropylene, copolymers thereof, thermoplastic elastomers (TPEs), in particular thermoplastic polyolefins (TPOs), or mixtures thereof.

Preferably, for medium voltage applications, the outer semiconductive layer is obtained from a semiconducting polymer composition comprising HDPE and/or MDPE.

Preferably, for high voltage applications, the outer semiconductive layer is obtained from a semiconducting polymer composition comprising a polypropylene-based thermoplastic polymer material. The polypropylene-based thermoplastic polymer material can include a propylene homopolymer or propylene copolymer, and preferably a propylene copolymer.

The outer semiconductive layer may be at least partially crosslinked. It may be obtained from a crosslinkable semiconducting polymer composition comprising peroxide(s), azide(s) and/or other free radical initiator(s) as crosslinking agent.

Alternatively, it may be obtained from a crosslinkable semiconducting polymer composition substantially free of peroxides, azides and/or other free radical initiators, notably according to the present invention. For example, the inner and outer semiconducting layers may be obtained each from a crosslinkable semiconducting polymer composition substantially free of peroxides, azides and/or other free radical initiators. For example, the crosslinkable semiconducting polymer composition of the inner crosslinked semiconducting layer is identical to the crosslinkable semiconducting polymer composition of the outer crosslinked semiconducting layer.

Alternatively, the outer semiconducting layer is obtained from an outer semiconducting polymer composition comprising a thermoplastic material. Accordingly, in this case, the outer semiconducting layer is a non-crosslinked layer or, in other words, a thermoplastic layer.

Crosslinkable Semiconducting Polymer Composition

According to a first alternative embodiment, the crosslinkable semiconducting polymer composition comprises:
- at least one polymer (A) having at least one epoxy functional group,
- a crosslinking agent (B) having at least one reactive functional group capable of reacting with the epoxy functional group of the polymer (A) in order to allow the crosslinking of the polymer (A),
- and optionally, an olefin polymer (C).

According to a second alternative embodiment, the crosslinkable semiconducting polymer composition comprises:
- at least one olefin polymer (D), and
- a crosslinking agent (E) having at least one oxazoline functional group, the olefin polymer (D) having at least one reactive functional group capable of reacting with the oxazoline functional group of the crosslinking agent (E) in order to allow the crosslinking of the polymer (D).

In the present description, the term "olefin polymer" as such means generally olefin homopolymer and olefin copolymer. The olefin copolymer may be obtained from at least two monomers or from at least three monomers (i.e., olefin terpolymer) or more, and may be a block or statistical copolymer.

First Alternative Embodiment

Polymer (A)

The epoxy functional group (i.e., the epoxide functional group) of the polymer (A) is more particularly an oxirane functional group (i.e., an ethylene oxide group).

Preferably, the epoxy functional group can be contributed by a compound comprising said epoxy functional group. This compound may be chosen from glycidyl ester groups. Thus, the polymer (A) may comprise glycidyl ester groups.

The polymer (A) may comprise at most 15% by weight of epoxy functional group, preferably at most 10%, and more preferably at most 5%, by weight of epoxy functional group.

The polymer (A) may comprise at least 0.1% by weight of epoxy functional group and preferably at least 1% by weight of epoxy functional group.

The polymer (A) may comprise at least one olefin polymer (i.e., olefin homopolymer or olefin copolymer).

Preferably, said olefin polymer is a noncyclic olefin polymer.

Preferably, said olefin polymer is an ethylene polymer (i.e., ethylene homo- or copolymer) or a propylene polymer (i.e., propylene homo- or copolymer).

The polymer (A) may be a grafted polymer (i.e., grafted homo- or copolymer) or a copolymer.

Grafted Polymer as Polymer (A)

The epoxy functional group of the polymer (A) may be grafted to said polymer (A). Thus, the polymer (A) comprising at least one epoxy functional group may be an epoxy-grafted polymer. In other words, the polymer (A) may be a polymer comprising at least one epoxy functional group grafted to the macromolecular chain (i.e., main chain or backbone) of said polymer. The ends of the macromolecular chain of the polymer may or may not, for their part, be grafted with the epoxy functional group.

For example, the polymer (A) may be an epoxy-grafted olefin homopolymer or an epoxy-grafted olefin copolymer. For example, the polymer (A) comprising at least one epoxy functional group is an epoxy-grafted ethylene or propylene homopolymer, or an epoxy-grafted ethylene or propylene copolymer.

Copolymer as Polymer (A)

The polymer (A) comprising at least one epoxy functional group may be a copolymer obtained from at least two monomers, one of the two monomers comprising said epoxy functional group, or obtained from at least three monomers (i.e., terpolymer), one of the three monomers comprising said epoxy functional group. Said monomer comprising said epoxy functional group may be chosen from the following compounds: butenecarboxylic acid monoglycidyl ester, glycidyl methacrylate, glycidyl acrylate, methylglycidyl acrylate, methylglycidyl methacrylate, itaconic acid glycidyl ester, 7,8-epoxy-1-octyl methacrylate, itaconic acid methylglycidyl ester, 7,8-epoxy-1-octyl vinyl ether, vinyl glycidyl ether, allyl glycidyl ether and 2-methyl-2-propenyl glycidyl ether.

For example, the polymer (A) may be a copolymer obtained from an olefin monomer, preferably an ethylene or propylene monomer, and a monomer comprising at least one epoxy functional group, as described above. For example, the polymer (A) comprising at least one epoxy functional group is a copolymer of ethylene and of glycidyl methacrylate or acrylate.

Preferably, the weight of the monomer carrying the epoxy functional group(s) in the copolymer is below 15%, preferably below 10%, more preferably below 5%, relative to the weight of the copolymer. This quite low content of the monomer carrying the epoxy functional group(s) in the copolymer may enable to avoid excessive reactivity of epoxy functional group(s) of the polymer (A) with reactive functional group(s) of crosslinking agent (B).

The weight of the monomer carrying the epoxy functional group(s) in the copolymer may be at least 0.1% and preferably at least 1% relative to the weight of the copolymer.

The crosslinkable semiconducting polymer composition of the first alternative embodiment may comprise more than 50.0 parts by weight of polymer(s) comprising at least one epoxy functional group (i.e., polymer (A)) per 100 parts by weight of polymer(s) (i.e., polymer matrix) in the polymer composition; preferably at least 70 parts by weight of polymer(s) A per 100 parts by weight of polymer(s) in said polymer composition; and particularly preferably at least 90 parts by weight of polymer(s) A per 100 parts by weight of polymer(s) in said polymer composition.

In the first alternative embodiment, when reference is made to "100 parts by weight of polymer(s)", this is understood to mean preferably the polymer or polymers other than the crosslinking agent (B) in the polymer composition (when the crosslinking agent (B) is in the polymer form).

In a specific embodiment, the polymer (A) may additionally comprise at least one acrylate functional group. This acrylate functional group advantageously makes it possible to render the polymer (A) supple and more flexible.

According to a first alternative form, the acrylate functional group may be grafted to the polymer (A). The polymer (A) is, according to this first alternative form, an acrylate-grafted polymer. In other words, the polymer (A) may be a polymer comprising at least one acrylate functional group grafted to the macromolecular chain (i.e., main chain or backbone) of said polymer. The ends of the macromolecular chain of the polymer may or may not, for their part, be grafted with the acrylate functional group.

According to a second alternative form, the polymer (A) may be a copolymer obtained from at least two monomers, one of the two monomers comprising said acrylate functional group. For example, the polymer (A) comprising at least one epoxy functional group is a terpolymer of ethylene, of methyl acrylate and of glycidyl methacrylate.

Crosslinking Agent (B)

The reactive functional group of the crosslinking agent (B) will react directly with the epoxy functional group of the polymer (A) after opening of the epoxy during a rise in temperature.

The crosslinking agent (B) may comprise at least one reactive functional group selected from a carboxyl functional group and/or precursor thereof and/or derivative thereof, an amine functional group and/or precursor thereof and/or derivative thereof, and a hydrazide functional group and/or precursor thereof and/or derivative thereof.

The crosslinking agent (B) comprising at least one carboxyl functional group and/or precursor thereof and/or derivative thereof may comprise a carboxylic acid functional group, such as unsaturated monocarboxylic acid or unsaturated dicarboxylic acid for example, an acid anhydride functional group, such as unsaturated dicarboxylic acid anhydride for example, an ester functional group, such as alkyl acrylate for example, an aromatic thiol functional group and a phenol functional group.

For example, the crosslinking agent (B) comprising at least one carboxyl functional group and/or precursor thereof and/or derivative thereof may be chosen from the following compounds: acrylic acid, methacrylic acid, maleic anhydride, terbutyl acrylate and methyl acrylate.

The crosslinkable semiconducting polymer composition may comprise an amount of crosslinking agent (B) in an amount necessary and sufficient to obtain the at least partially crosslinked semiconducting layer.

The content of polymer (A) and of crosslinking agent (B) may be chosen so that 1 epoxy functional group of polymer (A) reacts with 1 carboxyl functional group or precursor thereof or derivative thereof of crosslinking agent (B) (when the crosslinking agent (B) comprises carboxyl functional groups and/or precursors thereof and/or derivatives thereof).

The crosslinking agent (B) may be a non-polymeric compound or a polymeric compound.

Non-Polymeric Compound as Crosslinking Agent (B)

The crosslinking agent (B) may be a non-polymeric compound (hereinafter referred to as "non-polymeric crosslinking agent (B)").

The non-polymeric crosslinking agent (B) is an organic compound which is different from a polymer. In other words, the non-polymeric crosslinking agent (B) is notably not derived from the covalent linking of a large number of identical or different monomer units, and preferably is not derived from the covalent linking of at least two identical or different monomer units.

In a specific embodiment, the non-polymeric crosslinking agent (B) can comprise at least two reactive functional groups. These at least two reactive functional groups can be identical or different and can be chosen without distinction from a carboxyl functional group and/or precursor thereof and/or derivative thereof, an amine functional group and/or precursor thereof and/or derivative thereof, and a hydrazide functional group and/or precursor thereof and/or derivative thereof.

Mention may be made, as examples of non-polymeric crosslinking agent (B) of amino acids, diamines, anhydrides, Lewis acids or Brønsted acids.

The preferred non-polymeric crosslinking agent (B) is chosen from:
- a non-polymeric compound comprising at least one amine functional group, such as 1-tetradecylamine (TDA),
- a non-polymeric compound comprising at least two amine functional groups, such as 1,8-diaminooctane (DAO) or N,N'-dimethyl-1,8-octanediamine (DMAO),
- a non-polymeric compound comprising at least one carboxyl functional group,
- a non-polymeric compound comprising at least two carboxyl functional groups, such as 1,10-decanedicarboxylic acid (DDA),
- a non-polymeric compound comprising at least one amine functional group and at least one carboxyl functional group, such as amino acid, for example 11-aminoundecanoic acid,
- a non-polymeric compound comprising at least one hydrazide functional group, such as octanoic hydrazide (OAD),
- a non-polymeric compound comprising at least two hydrazide functional groups, such as adipic acid dihydrazide (AAD),
- a non-polymeric compound comprising at least two phenolic functional groups, such as 2,2-bis(4-hydroxy-3-methylphenyl)propane (BHMP), a non-polymeric compound comprising at least one anhydride functional group, such as dodecenylsuccinic anhydride for example, preferably in combination with a crosslinking catalyst, one of the above mentioned compounds in combination with a transition metal catalyst, such as titanium(IV) 2-ethylhexyloxide, or titanium(IV) isopropoxide, or titanium(IV) ethoxide or similar, and one of their mixtures.

When the non-polymeric crosslinking agent (B) comprises at least one amine functional group, the amine functional group is a primary or secondary amine.

As mentioned above, when the non-polymeric crosslinking agent (B) comprises at least one amine functional group and at least one carboxyl functional group, the non-polymeric crosslinking agent (B) is for example an amino acid.

The amino acid typically comprises two functional groups: a carboxyl —COOH functional group and an amine functional group which is preferably of the primary amine —NH$_2$ type.

The carbon chain separating the carboxyl functional group from the amine functional group can comprise from 1 to 50 carbon atoms and preferably from 1 to 20 carbon atoms.

Conventionally, the carboxyl and amine functional groups can be positioned at the ends of the main carbon chain of said amino acid, the main carbon chain preferably being an unbranched chain.

The amino acid can also be an alpha-amino acid, which is defined by the fact that the amine functional group is bonded to the carbon atom adjacent to the carboxyl functional group (the alpha-carbon).

Mention may be made, as preferred example, of 11-aminoundecanoic acid.

When the non-polymeric crosslinking agent (B) comprises an anhydride functional group, the crosslinkable semiconducting polymer composition can additionally comprise a crosslinking catalyst or, in other words, said non-polymeric crosslinking agent (B) comprising an anhydride functional group is combined, in the crosslinkable semiconducting polymer composition, with a crosslinking catalyst.

The non-polymeric crosslinking agent (B) comprising an anhydride functional group is more particularly an organic compound. In other words, the non-polymeric crosslinking agent (B) comprising an anhydride functional group is composed solely of carbon and of hydrogen and optionally of oxygen.

More particularly, said non-polymeric crosslinking agent (B) comprising an anhydride functional group additionally comprises an aliphatic chain comprising at least five carbon atoms, said chain being saturated or unsaturated.

Mention may be made, by way of example, of dodecenylsuccinic anhydride.

By way of example, the crosslinkable semiconducting polymer composition of the first alternative embodiment may comprise at most 15.0 parts by weight of crosslinking agent (B) per 100 parts by weight of polymer(s) in the polymer composition, preferably at most 10.0 parts by weight of crosslinking agent (B) per 100 parts by weight of polymer(s) in the polymer composition and preferably at most 5.0 parts by weight of crosslinking agent (B) per 100 parts by weight of polymer(s) in the polymer composition.

The crosslinkable semiconducting polymer composition of the first alternative embodiment may comprise at least 0.1 part by weight of crosslinking agent (B) per 100 parts by weight of polymer(s) in the polymer composition and preferably at least 0.5 part by weight of crosslinking agent (B) per 100 parts by weight of polymer(s) in the polymer composition.

In the first alternative embodiment, when reference is made to "100 parts by weight of polymer(s)", this is understood to mean preferably the polymer or polymers other than the crosslinking agent (B) in the polymer composition (when the crosslinking agent (B) is in the polymer form).

Polymeric Compound as Crosslinking Agent (B)

The crosslinking agent (B) may be a polymeric compound (hereinafter referred to as "polymer (B)").

Preferably, the polymer (B) is different from the polymer (A).

The polymer (B) may comprise at most 15% by weight of reactive functional group, preferably at most 10%, and more preferably at most 5%, by weight of reactive functional group.

The polymer (B) may comprise at least 0.1% by weight of reactive functional group, and preferably at least 1% by weight of reactive functional group.

The polymer (B) may comprise at least one olefin polymer (i.e., at least one olefin homopolymer or olefin copolymer).

Preferably, said olefin polymer is a noncyclic olefin polymer.

Preferably, said olefin polymer is an ethylene polymer (i.e., ethylene homo- or copolymer) or a propylene polymer (i.e., propylene homo- or copolymer).

The polymer (B) may be a grafted polymer (i.e., grafted homo- or copolymer) or a copolymer.

Grafted Polymer as Polymer (B)

The reactive functional group of the polymer (B), which is capable of reacting with the epoxy functional group of the polymer (A) in order to allow the crosslinking of the polymer (A), may be grafted to said polymer (B). Thus, the polymer (B) comprising at least one reactive functional group may be a polymer grafted with at least one reactive functional group. In other words, the polymer (B) may be a polymer comprising at least one reactive functional group grafted to the macromolecular chain (i.e., main chain or backbone) of said polymer. The ends of the macromolecular chain of the polymer may or may not, for their part, be grafted with the reactive functional group.

For example, the polymer (B) may be an amine-grafted polyether (generally called polyetheramine), and preferably an amine-terminated polyether. The polyether may be selected from poly(ethylene glycol), poly(ethylene oxide), poly(propylene glycol) and poly(propylene oxide). For example, the polymer (B) is a poly(ethylene glycol) bis (amine), a poly(propylene glycol) bis(2-aminopropyl ether), a poly(ethylene oxide) 4-arm, amine-terminated or a trimethylolpropane tris[poly(propylene glycol) amine terminated] ether.

Copolymer as Polymer (B)

The polymer (B) comprising at least one reactive functional group may be a copolymer obtained from at least two monomers, one of the two monomers comprising said reactive functional group.

Preferably, said monomer comprising said reactive functional group is chosen from monomers comprising at least one carboxyl functional group and/or precursor thereof and/or derivative thereof, such as monomers comprising a carboxylic acid functional group, such as unsaturated monocarboxylic acid or unsaturated dicarboxylic acid for example, an acid anhydride functional group, such as unsaturated dicarboxylic acid anhydride for example, an ester functional group, such as alkyl acrylate for example, an aromatic thiol functional group and a phenol functional group.

For example, said monomer comprising said carboxyl functional group and/or precursor thereof and/or derivative thereof may be chosen from the following compounds: acrylic acid, methacrylic acid, maleic anhydride, terbutyl acrylate and methyl acrylate.

For example, the polymer (B) may be a copolymer obtained from an olefin monomer, preferably an ethylene or propylene monomer, and a monomer comprising at least one reactive functional group, as described above. For example, the polymer (B) comprising at least one reactive functional group is a copolymer of ethylene and of acrylic or methacrylic acid, or a copolymer of propylene and of maleic anhydride or terbutyl acrylate.

Preferably, the weight of the monomer carrying the carboxyl functional group(s) and/or precursor(s) thereof and/or derivative(s) thereof in the copolymer is below 15%, preferably below 10%, more preferably below 5%, relative to the weight of the copolymer. This quite low content of the monomer carrying the carboxyl functional group(s) and/or precursor(s) thereof and/or derivative(s) thereof in the copolymer may enable to avoid excessive reactivity of carboxyl functional group(s) and/or precursor(s) thereof and/or derivative(s) thereof of the crosslinking agent (B) with epoxy functional group(s) of the polymer (A).

The weight of the monomer carrying the carboxyl functional group(s) and/or precursor(s) thereof and/or derivative(s) thereof in the copolymer may be at least 0.1% and preferably at least 1% relative to the weight of the copolymer.

Olefin Polymer (C)

The crosslinkable semiconducting polymer composition may comprise at least one olefin polymer (C) having a melting point temperature greater than 90° C., notably greater than 100° C., 110° C., 120° C. or 130° C.

The olefin polymer C may be selected from polyethylene, notably high-density polyethylene (HDPE), medium-density polyethylene (MDPE) and low-density polyethylene (LDPE), polypropylene, copolymers thereof, thermoplastic elastomers (TPEs) and mixtures thereof.

Suitable thermoplastic elastomers (TPEs) are preferably thermoplastic polyolefins (TPOs), in particular thermoplastic polyolefins (TPOs) comprising a polyolefin matrix, such as for example polypropylene (PP), polyethylene (PE) or copolymers thereof, and a rubber component, such as for example ethylene propylene rubber, in particular EPR copolymer (EPR for ethylene propylene rubber, also called EPM copolymer) or EPDM terpolymer (EPDM for ethylene propylene diene monomer).

Preferably, the olefin polymer C is different from the polymer (A) and from the polymer (B) (when the crosslinking agent (B) is a polymeric compound).

When the crosslinkable semiconducting polymer composition comprises the olefin polymer (C), the weight of (polymer (A)+crosslinking agent (B)) is preferably at most 30%, preferably at most 25%, and more preferably at most 20%, relative to the weight of (polymer (A)+crosslinking agent (B)+olefin polymer C).

In this case, the at least partially crosslinked semiconducting layer obtained from this crosslinkable semiconducting polymer composition can have a gel content, according to ASTM D2765-01 (xylene extraction), of at most 30%, preferably at most 25%, and more preferably at most 20%.

When the crosslinkable semiconducting polymer composition comprises the olefin polymer (C), the weight of (polymer (A)+crosslinking agent (B)) may be at least 1%, preferably at least 5%, and more preferably at least 10%, relative to the weight of (polymer (A)+crosslinking agent (B)+olefin polymer C).

In this case, the at least partially crosslinked semiconducting layer obtained from this crosslinkable semiconducting polymer composition has a gel content, according to ASTM D2765-01 (xylene extraction), of at least 1%, preferably at least 5%, and more preferably at least 10%.

When the crosslinkable semiconducting polymer composition comprises the olefin polymer (C), the polymer (A) and polymer (B) can react with each other when enough heat is applied to the crosslinkable semiconducting polymer composition. This will create a crosslinked network. Advantageously, the olefin polymer (C) will be unaffected and maintain a thermoplastic behavior, but will be intertwined in the crosslinked network of the polymer (A) and polymer (B). Advantageously, the high crystallinity of the olefin polymer (C) will give a higher melting and softening temperature and, when the electrical cable accessory according to the invention is a cable joint, notably a flexible joint, it will minimize interphases between the at least partially crosslinked semiconducting layer of the cable joint and the semiconducting layers of the joined electrical cables.

In a specific example, the crosslinkable semiconducting polymer composition comprises:
the polymer (A), that is preferably an olefin polymer,
the polymer (B), that is preferably an olefin polymer, and
the olefin polymer (C).

Second Alternative Embodiment

Olefin Polymer (D)

The reactive functional group of the polymer (D) will react directly with the oxazoline functional group of the crosslinking agent (E) after opening of the oxazoline during a rise in temperature.

The reactive functional group of the polymer (D) may be chosen from a carboxyl functional group, a precursor of the carboxyl functional group, such as, for example, an anhydride, an aromatic thiol functional group and a phenol functional group.

Thus, the chemical reaction between the reactive functional group of the polymer (D) of the carboxyl functional group type and the oxazoline functional group of the crosslinking agent (E) will make it possible to form a stable amide functional group covalently bonded to an ester functional group: the ester functional group originating from the reactive functional group of the polymer (D) and the amide functional group originating from the oxazoline of the crosslinking agent (E). This chemical crosslinking reaction can be illustrated as follows, under the action of heat (a):

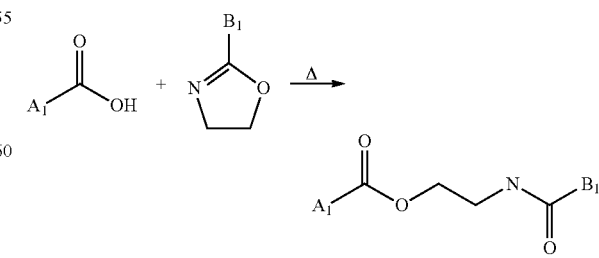

$A_1$ symbolizes the structure of the polymer (D) and $B_1$ symbolizes the structure of the crosslinking agent (E).

During this crosslinking reaction, no toxic product is thus formed.

The polymer (D) of the second alternative embodiment may comprise at most 20% by weight of reactive functional group and preferably at most 10% by weight of reactive functional group, with respect to the total weight of the polymer (D).

The polymer (D) of the second alternative embodiment may comprise at least 0.2% by weight of reactive functional group and preferably at least 1% by weight of reactive functional group, with respect to the total weight of the polymer (D).

Of course, mixtures of different polymers D can be envisaged in the context of the second alternative embodiment, in particular with different amounts of reactive functional group.

The olefin polymer (D) (i.e., olefin polymer comprising one or more reactive functional groups capable of reacting with the oxazoline functional group of the crosslinking agent (E)) is obtained from the polymerization of at least one olefin monomer, said olefin monomer preferably being an ethylene monomer. Therefore, the olefin polymer (D) is preferably an ethylene polymer comprising one or more reactive functional groups capable of reacting with the oxazoline functional group of the crosslinking agent (E).

The olefin polymer (D) can be of the thermoplastic or elastomer type.

Preferably, the olefin polymer (D) is of the thermoplastic type, in order to optimize the desired properties, in particular the electrical properties. Thermoplastic polymers conventionally have a melting point which can be easily determined by differential scanning calorimetry (or DSC) according to Standard ASTM D 3418.

The olefin polymer (D) can have a melt flow index (MFI) or a melt flow rate (MFR) of between 0.25 and 20 (limits included), preferably between 0.5 and 15 (limits included) and more preferably still between 5 and 12 (limits included), expressed in grams/10 minutes according to Standard ASTM D 1238 at 190° C./2.16 kg.

The temperature (i.e., 190° C.) and the weight (i.e., 2.16 kg) mentioned according to Standard ASTM D 1238 respectively refer to the temperature of the barrel and of the die of the measurement device and to the total weight of the piston with load which presses on the material to be measured in order to force it through the die of said device.

The olefin polymer (D) may be an ethylene polymer (i.e., ethylene homo- or copolymer), notably chosen from high-density polyethylenes (HDPEs), medium-density polyethylenes (MDPEs), low-density polyethylenes (LDPEs), linear low-density polyethylenes (LLDPEs) and very-low-density polyethylenes (VLDPEs), or may be a propylene polymer (i.e., propylene homo- or copolymer).

In the present description, the terms "high-density", "medium-density", "low-density" and "very-low-density" correspond to a density, measured according to ISO 1183A at 23° C., ranging from about 0.941 to 0.965, from about 0.926 to 0.940, from about 0.911 to 0.925 and from about 0.880 to 0.910, respectively.

The melting point of the polymers D of the second alternative embodiment may be between 80 and 170° C., preferably between 80 and 120° C. and more preferably between 90 and 115° C. The melting point of a polymer is conventionally measured at the melting peak of said polymer by differential scanning calorimetry (DSC) with a temperature gradient of 20° C./min under a nitrogen atmosphere.

The crosslinkable semiconducting polymer composition of the second alternative embodiment may comprise more than 50.0 parts by weight of polymer (D) per 100 parts by weight of polymer(s) (i.e., polymer matrix) in the polymer composition, preferably at least 70 parts by weight of polymer (D) per 100 parts by weight of polymer(s) in said polymer composition, preferably at least 90 parts by weight of polymer (D) per 100 parts by weight of polymer(s) in said polymer composition and particularly preferably only one or more polymers D.

The olefin polymer (D) is preferably not a polyacrylate. More particularly, the polymer (D) does not comprise an ester functional group of the general formula RCOOR'. This is because ester functional groups are not at all advantageous for the mechanical properties desired in the field of cable accessory manufacture of the invention.

Polyacrylates are typically obtained by the polymerization of acrylic ester(s), in particular in the presence of olefin monomer.

In the case where the polyacrylate is obtained without the presence of olefin monomer, the olefin polymer (D) is clearly different from the polyacrylate, since the olefin polymer (D) is obtained by polymerization starting from at least one olefin monomer.

Mention may be made, as examples of polyacrylates, to alkyl acrylate copolymers.

Polyacrylates thus have all pendant ester functional groups on their macromolecular chain, these functional groups preferably not coming within the scope of the second alternative embodiment.

The polyacrylates described above are not at all advantageous for the mechanical properties desired in the field of cable accessory manufacture of the invention.

In a specific embodiment, the crosslinkable semiconducting polymer composition of the second alternative embodiment may comprise less than 10 parts by weight of polyacrylate, and preferably less than 5 parts by weight of polyacrylate, per 100 parts by weight of polymer(s) in the polymer composition. Preferably, the crosslinkable semiconducting polymer composition does not comprise polyacrylate. More particularly, the cable accessory of the invention does not comprise polyacrylate.

The olefin polymer (D) is preferably not a polyimide. More particularly, the polymer (D) does not comprise an imide functional group of general formula $(RCO)_2NR'$. Imide functional groups are not at all advantageous for the mechanical properties desired in the field of cable accessory manufacture of the invention.

In a specific embodiment, the crosslinkable semiconducting polymer composition of the second alternative embodiment may comprise less than 10 parts by weight of polyimide and preferably less than 5 parts by weight of polyimide, per 100 parts by weight of polymer(s) in the polymer composition. Preferably, the crosslinkable semiconducting polymer composition does not comprise polyimide. More particularly, the cable accessory of the invention does not comprise polyimide.

Furthermore, the crosslinkable semiconducting polymer composition of the second alternative embodiment may comprise less than 10 parts by weight of fluoropolymer and preferably less than 5 parts by weight of fluoropolymer per 100 parts by weight of polymer(s) in the polymer composition. Preferably, the crosslinkable semiconducting polymer composition does not comprise fluoropolymer. More particularly, the cable accessory of the invention does not comprise fluoropolymer.

In the second alternative embodiment, when reference is made to "100 parts by weight of polymer(s)", this is preferably understood to mean the polymer or polymers other than the crosslinking agent (E) in the polymer composition (when the crosslinking agent (E) is in the form of a polymer).

The crosslinkable semiconducting polymer composition of the second alternative embodiment may comprise at least 40.0% by weight of polymer(s) and preferably at least 50.0% by weight of polymer(s), with respect to the total weight of the polymer composition, thus forming the polymer matrix of the polymer composition. Preferably, the crosslinkable semiconducting polymer composition of the second alternative embodiment may comprise at most 99.8% by weight of polymer(s) and preferably at most 96.0% by weight of polymer(s) with respect to the total weight of the polymer composition.

The polymer matrix in particular does not include the crosslinking agent (E) when it is in the form of a polymer.

The olefin polymer (D) is a polymer which makes it possible to be shaped by extrusion.

Preferably, the olefin polymer (D) is a noncyclic olefin polymer.

Preference will be given to the use of an ethylene polymer (ethylene homo- or copolymer) or a propylene polymer (propylene homo- or copolymer) as polymer (D).

The olefin polymer (D) may be a grafted polymer (i.e., grafted homo- or copolymer) or a copolymer.

Grafted Polymer as Polymer (D)

The reactive functional group of the polymer (D), which is capable of reacting with the oxazoline functional group of the crosslinking agent (E), may be grafted to said polymer (D) or more particularly to the macromolecular chain of the polymer (D) which is of the olefin polymer type.

Thus, the polymer (D) comprising at least one reactive functional group may be an olefin polymer grafted with at least one reactive functional group. In other words, the polymer (D) may be an olefin polymer comprising at least one reactive functional group grafted to the macromolecular chain (i.e., main chain or backbone) of said polymer. For their part, the ends of the macromolecular chain of the polymer may or may not be grafted with said reactive functional group.

Mention may be made, by way of example, as polymer (D), of polyethylene grafted with maleic anhydride.

The olefin polymer (D) may be an olefin homopolymer grafted with a reactive functional group or an olefin copolymer grafted with a reactive functional group, it being possible for the reactive functional group to preferably be a carboxyl functional group.

Copolymer as Polymer (D)

The polymer (D) may be a copolymer of olefin and of a monomer carrying the reactive functional group. In other words, the polymer (D) can be a copolymer obtained from the polymerization of at least two monomers, one being an olefin monomer and the other being a monomer comprising said reactive functional group. Said monomer comprising said reactive functional group can be chosen from unsaturated carboxylic acid monomers comprising in particular a carbon-carbon double bond, such as, for example, acrylic acid, methacrylic acid, maleic acid, fumaric acid, crotonic acid, isocrotonic acid, tiglic acid, vinylacetic acid, 2-pentenoic acid, 3-pentenoic acid, allylacetic acid, angelic acid, citraconic acid or mesaconic acid monomers.

Mention may be made, by way of example, as polymer (D), of copolymers of ethylene and of acrylic or methacrylic acid.

Terpolymers, or in other words copolymers obtained from three monomers, can also be envisaged in the context of the second alternative embodiment. In this case, the polymer (D) can be a copolymer obtained from the polymerization of three different monomers, the first being an olefin monomer and the second and the third being monomers comprising said reactive functional group. Said monomers comprising said reactive functional group can be chosen independently from unsaturated carboxylic acid monomers and their derivatives comprising in particular a carbon-carbon double bond, such as, for example, acrylic acid, methacrylic acid, maleic acid, fumaric acid, crotonic acid, isocrotonic acid, tiglic acid, vinylacetic acid, 2-pentenoic acid, 3-pentenoic acid, allylacetic acid, angelic acid, citraconic acid or mesaconic acid monomers.

Mention may be made, by way of example, of terpolymers of ethylene, of methacrylic acid and of acrylic acid.

The polymer (D) may be a copolymer obtained from an olefin monomer and a monomer comprising at least one reactive functional group.

Crosslinking Agent (E)

The crosslinking agent (E) may comprise at least two reactive functional groups intended to react with the reactive functional group or groups of the olefin polymer (D). At least one of these two reactive functional groups is an oxazoline functional group. Preferably, the crosslinking agent (E) comprises at least two oxazoline functional groups.

The oxazoline functional group is a functional group, the general formula (I) of which is as follows:

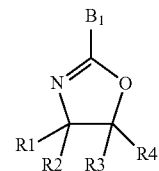

$B_1$ symbolizes the structure of the crosslinking agent (E) which carries at least one of this oxazoline functional group.

$B_1$ can thus be the macromolecular chain of a polymer or a non-polymeric compound of aliphatic or aromatic type.

The oxazoline functional group can be covalently attached to $B_1$ by a carbon unit, an ether unit, an ester unit, a urethane unit or a heteroatom of the nitrogen, phosphorus or sulfur type.

R1, R2, R3 and R4 can be chosen, independently of one another, from a hydrogen atom and an alkyl group. Preferably, R1, R2, R3 and R4 are hydrogens.

The crosslinking agent (E) can be a polymeric compound or a non-polymeric compound.

Non-Polymeric Compound as Crosslinking Agent (E)

The non-polymeric crosslinking agent (E) is typically not derived from the covalent linking of a large number of identical or different monomer units, and preferably is not derived from the covalent linking of at least two identical or different monomer units.

The non-polymeric crosslinking agent (E) may comprise at least two oxazoline functional groups.

Mention may be made, by way of example, as non-polymeric compound comprising two oxazoline functional groups, of bisoxazolines, such as, for example 2,2'-(1,3-phenylene)bis(2-oxazoline) (1,3-PBO), 2,2'-(1,4-phenylene)bis(2-oxazoline) (1,4-PBO) or 2,2'-(2,6-pyridylene)bis(2-oxazoline) (pybox).

The non-polymeric crosslinking agent (E) may comprise more than two oxazoline functional groups, mention may be made, for example, of compounds comprising three oxazoline functional groups, such as 2,2',2''-(1,3,5-phenylene)tris (2-oxazoline) or 2,2',2''-(1,2,4-phenylene)tris(5-methyl-2-oxazoline).

Polymeric Compound as Crosslinking Agent (E)

The polymeric crosslinking agent (E) is preferably different from polymer (D).

The polymeric crosslinking agent (E) may be a copolymer functionalized with oxazoline functional groups.

Mention may be made, by way of example, as polymeric crosslinking agent (E), of the copolymer sold by Nippon Sokubai under the Epocros reference.

The oxazoline functional group of the crosslinking agent (E) is capable of reacting with the reactive functional group of the olefin polymer (D) to make possible the crosslinking of the olefin polymer (D).

The crosslinking agent (E) is preferably in the powder form in order to facilitate the metering thereof when it is employed by extrusion.

Conventionally, the crosslinking kinetics relative to the crosslinking agent (E) and more particularly the opening of the oxazoline ring are a function of the temperature of the reaction medium. By way of example, the crosslinking can be carried out at temperatures of at least 70° C., preferably of between 70 and 120° C. and preferably of between 80 and 100° C., these temperatures being in particular well suited for the processing of the crosslinkable semiconducting polymer composition by extrusion.

A temperature of less than 70° C. can be used but the crosslinking will be relatively slow.

A temperature of greater than 200° C. at a pressure greater than atmospheric pressure, for a few minutes, can in addition also be used for crosslinking of the crosslinkable semiconducting polymer composition of the second alternative embodiment, such as, for example, a temperature of between 250 and 350° C., in particular at a pressure of 10 bar.

Preferably, the crosslinking agent (E) has a melting point greater than the melting point of the polymer (D). The melting point of the crosslinking agent (E) is conventionally measured at the melting peak of said crosslinking agent (E) by differential scanning calorimetry (DSC) with a temperature gradient of 10° C./min under a nitrogen atmosphere.

By way of example, the melting point:
of 2,2'-(1,3-phenylene)bis(2-oxazoline) (1,3-PBO) is approximately 148° C.;
of 2,2'-(1,4-phenylene)bis(2-oxazoline) (1,4-PBO) is approximately 242° C.; and
of 2,2'-(2,6-pyridylene)bis(2-oxazoline) (pybox) is approximately 157° C.

The crosslinkable semiconducting polymer composition of the second alternative embodiment may comprise a sufficient amount of crosslinking agent (E) to be able to carry out the crosslinking of the polymer (D).

The crosslinkable semiconducting polymer composition of the second alternative embodiment may comprise at most 20.0 parts by weight of crosslinking agent (E) per 100 parts by weight of polymer(s) in the polymer composition, and preferably at most 15.0 parts by weight of crosslinking agent (E) per 100 parts by weight of polymer(s) in the polymer composition.

The crosslinkable semiconducting polymer composition of the second alternative embodiment may comprise at least 0.1 part by weight of crosslinking agent (E) per 100 parts by weight of polymer(s) in the polymer composition and preferably at least 5 parts by weight of crosslinking agent (E) per 100 parts by weight of polymer(s) in the polymer composition.

In the second alternative embodiment, when reference is made to "100 parts by weight of polymer(s)", this is preferably understood to mean the polymer or polymers other than the crosslinking agent (E) (when the crosslinking agent (E) is in the polymer form).

The crosslinkable semiconducting polymer composition of the second alternative embodiment may comprise at most 20% by weight of crosslinking agent (E) with respect to the total weight of the polymer composition.

The crosslinkable semiconducting polymer composition of the second alternative embodiment may comprise at least 0.1% by weight of crosslinking agent (E) with respect to the total weight of the polymer composition.

The crosslinkable semiconducting polymer composition of the second alternative embodiment may comprise one or more agents which modify the crosslinking rate. These agents can react with the oxazoline functional group to form a modified oxazoline functional group. They can be polyfunctional molecules comprising at least three functional groups independently chosen from carboxyl, phenol and aromatic thiol functional groups.

Crosslinkable Semiconducting Polymer Composition

Whatever the nature of the polymer (polymer (A) or (D)) and of the crosslinking agent (crosslinking agent (B) or (E)), the crosslinkable semiconducting polymer composition may comprise the features as described below.

Particularly advantageously, the polymer or polymers of the crosslinkable semiconducting polymer composition are solely one or more olefin-based polymer(s) (i.e., olefin homopolymer and/or olefin copolymer), notably polyethylene and/or polypropylene.

The crosslinkable semiconducting polymer composition may comprise at least one conductive filler.

The conductive filler is preferably an electrically conductive filler.

The conductive filler may be selected from carbon black, graphite, carbon nanotubes, doped inorganic fillers such as for example zinc oxide doped with aluminum having a high conductivity and linear, intrinsically conductive polymer powders and mixtures thereof.

The conductive filler is preferably carbon black.

The conductive filler may be introduced into the crosslinkable semiconducting polymer composition in an amount sufficient to render said polymer composition semiconducting, this amount varying according to the type of electrically conducting filler selected.

By way of example, the appropriate amount of the conducting filler can be between 6% and 45% by weight in the crosslinkable semiconducting polymer composition for carbon black and can be between 0.1% and 5% by weight in the crosslinkable semiconducting polymer composition for carbon nanotubes.

The crosslinkable semiconducting polymer composition may comprise one or more additives selected from:
protective agents, such as antioxidants, UV stabilizers (e.g., copper-based ultraviolet screeners), agents for combating copper or agents for combating water treeing, metal deactivators,
processing aids, such as plasticizers, viscosity reducers, dielectric liquids, polar compounds,
compatibilizing agents,
coupling agents,
scorch retardants,
pigments, crosslinking catalysts,
agents which modify the crosslinking rate,
and one of their mixtures.

The additives may be in an amount of 0.1 to 30% by weight in the crosslinkable semiconducting polymer composition.

More particularly, the antioxidants make it possible to protect the crosslinkable semiconducting polymer composition from the thermal stresses brought about during the stages of manufacture of the cable accessory or of operation of the cable accessory.

The antioxidants are preferably chosen from:
sterically hindered phenolic antioxidants, such as tetrakis [methylene(3,5-di(t-butyl)-4-hydroxyhydro-cinnamate)]methane, octadecyl 3-(3,5-di(t-butyl)-4-hydroxyphenyl)propionate, 2,2'-thiodiethylenebis[3-(3,5-di(t-butyl)-4-hydroxyphenyl)propionate], 2,2'-thiobis (6-(t-butyl)-4-methylphenol), 2,2'-methylenebis(6-(t-butyl)-4-methylphenol), 1,2-bis(3,5-di(t-butyl)-4-hydroxyhydrocinnamoyl)hydrazine, and 2,2'-oxamidodiethyl bis[3-(3,5-di(t-butyl)-4-hydroxyphenyl)propionate];
thioethers, such as 4,6-bis(octylthiomethyl)-o-cresol, bis [2-methyl-4-{3-(n-(C12 or C14)alkylthio)-propionyloxy}-5-(t-butyl)phenyl]sulfide and thiobis[2-(t-butyl)-5-methyl-4,1-phenylene]bis[3-(dodecylthio) propionate];
sulfur-based antioxidants, such as dioctadecyl 3,3'-thiodipropionate or didodecyl 3,3'-thiodipropionate;
phosphorus-based antioxidants, such as phosphites or phosphonates, such as, for example, tris[2,4-di(t-butyl) phenyl]phosphite or bis[2,4-di(t-butyl)phenyl]pentaerythritol diphosphite; and
amine-type antioxidants, such as phenylenediamines (IPPD, 6PPD, and the like), styrenated diphenylamines, diphenylamines, mercaptobenzimidazoles and polymerized 2,2,4-trimethyl-1,2-dihydroquinoline (TMQ), the latter type of antioxidant being particularly preferred in the crosslinkable semiconducting polymer composition.

The TMQs can have different grades, namely:
a "standard" grade with a low degree of polymerization, that is to say with a residual monomer content of greater than 1% by weight and having a residual NaCl content which can range from 100 ppm to more than 800 ppm (parts per million by weight);
a "high degree of polymerization" grade with a high degree of polymerization, that is to say with a residual monomer content of less than 1% by weight and having a residual NaCl content which can range from 100 ppm to more than 800 ppm;
a "low content of residual salt" grade with a residual NaCl content of less than 100 ppm.

TMQ-type antioxidants are preferably used when the crosslinkable semiconducting polymer composition comprises conductive fillers.

The type of stabilizing agent and its content in the crosslinkable semiconducting polymer composition are conventionally chosen according to the maximum temperature to which the polymers are subjected during the production of the mixture and during their processing, in particular by extrusion, and also according to the maximum duration of exposure to this temperature.

The purpose of the crosslinking catalysts is to help in the crosslinking. The crosslinking catalyst can be chosen from Lewis acids, Brønsted acids and tin-based catalysts, such as, for example, dibutyltin dilaurate (DBTL).

The presence of one or more dielectric liquids in the crosslinkable semiconducting polymer composition enables to obtain better dielectric properties (i.e. better electrical insulation), and notably better dielectric strength of the semiconducting layer obtained from the crosslinkable semiconducting polymer composition. It can also allow improving mechanical properties and/or ageing resistance of said semiconducting layer.

Examples of dielectric liquids include mineral oils (e.g. naphthenic oils, paraffinic oils or aromatic oils), vegetable oils (e.g. soybean oil, linseed oil, rapeseed oil, corn oil or castor oil) or synthetic oils such as aromatic hydrocarbons (alkylbenzenes, alkylnaphthalenes, alkylbiphenyls, alkydiaryl ethylenes, etc.), silicone oils, ether-oxides, organic esters or aliphatic hydrocarbons.

According to a particular embodiment, the dielectric liquid represents about 1% to 20% by weight, preferably about 2 to 15% by weight, and more preferably about 3 to 12% by weight, based on the total weight of the crosslinkable semiconducting polymer composition.

The dielectric liquid can include a mineral oil and at least one polar compound of type benzophenone, acetophenone or one of their derivatives.

In this embodiment, the dielectric liquid can comprise at least about 70% by weight of mineral oil, preferably at least about 80% by weight of mineral oil, and particularly preferably at least about 90% by weight of mineral oil based on the total weight of the dielectric liquid.

The mineral oil is generally liquid at about 20-25° C.

The mineral oil can be selected from naphthenic oils and paraffinic oils.

The mineral oil is obtained from the refining of a petroleum crude oil.

According to a particularly preferred embodiment of the invention, the mineral oil comprises a paraffinic carbon (Cp) content ranging from about 45 to 65% atomic, a naphthenic carbon (Cn) content ranging from about 35 to 55% atomic and an aromatic carbon (Ca) content ranging from about 0.5 to 10% atomic.

In a particular embodiment, the polar compound of type benzophenone, acetophenone or one of their derivatives represents at least about 2.5% by weight, preferably at least about 3.5% by weight, and even more preferentially at least about 4% by weight, based on the total weight of the dielectric liquid.

According to a preferred embodiment of the invention, the polar compound of type benzophenone, acetophenone or one of their derivatives is selected from benzophenone, dibenzosuberone, fluorenone and anthrone. Benzophenone is particularly preferred.

Insulating Polymer Composition

The insulating polymer composition may comprise polyethylene, notably high-density polyethylene (HDPE), medium-density polyethylene (MDPE) and low-density polyethylene (LDPE), polypropylene, copolymers thereof, thermoplastic elastomers (TPEs), in particular thermoplastic polyolefins (TPOs), or mixtures thereof.

Preferably, the insulating polymer composition comprises a polypropylene-based thermoplastic material.

The polypropylene-based thermoplastic polymer material can include a propylene homopolymer P1 and/or a propylene copolymer P1.

The propylene homopolymer P1 preferably has an elastic modulus ranging from about 1250 to 1600 MPa.

The propylene homopolymer P1 can represent at least about 10% by weight, and preferably about 15 to 30% by weight, based on the total weight of the polypropylene-based thermoplastic polymer material.

Examples of propylene copolymers P1 include propylene and olefin copolymers, with olefin being selected in particular from ethylene and an olefin α1 different from the propylene.

The ethylene or olefin α1 different from the propylene of the propylene-olefin copolymer preferably represents at most about 15% by mole, and more preferably at most about 10% by mole, based on the total number of moles of propylene-olefin copolymer.

The olefin α1 different from the propylene can have the formula CH2=CH—$R_1$, wherein $R_1$ is a linear or branched alkyl group having from 2 to 12 carbon atoms, particularly selected from the following olefins al: 1-butene, 1-pentene; 4-methyl-1-pentene, 1-hexene, 1-octene, 1-decene, 1-dodecene, and one of their mixtures.

Propylene and ethylene copolymers are preferred as propylene copolymers P1.

The propylene copolymer P1 can be a random propylene copolymer or a heterophasic propylene copolymer.

The random propylene copolymer P1 preferably has an elastic modulus ranging from about 600 to 1200 MPa.

One example of a random propylene copolymer is the one marketed by Repsol with the product name ISPLEN® PR230C1E.

The heterophasic propylene copolymer can comprise a thermoplastic phase of propylene type and a thermoplastic elastomer phase of ethylene-olefin α2 copolymer type.

The olefin α2 of the thermoplastic elastomer phase of the heterophasic copolymer can be propylene.

The thermoplastic elastomer phase of the heterophasic copolymer can represent at least about 20% by weight, and preferably at least about 45% by weight, based on the total weight of the heterophasic copolymer.

The heterophasic propylene copolymer preferably has an elastic modulus ranging from 50 to 1200 MPa, and particularly preferably: either an elastic modulus ranging from about 50 to 550 MPa, and more particularly preferably ranging from about 50 to 250 MPa; or an elastic modulus ranging from about 600 to 1200 MPa.

One example of a heterophasic copolymer is the heterophasic copolymer marketed by LyondellBasell with the product name Adflex® Q 200 F, or the heterophasic copolymer marketed by LyondellBasell with the product name Moplen EP2967.

The propylene homopolymer or copolymer P1 can have a melting temperature greater than about 110° C., preferably greater than about 130° C., particularly preferably greater than or equal to about 140° C.

The propylene homopolymer or copolymer P1 can have a melting enthalpy ranging from about 20 to 100 J/g.

In particular, the propylene homopolymer P1 has a melting enthalpy ranging from about 80 to 90 J/g.

The random propylene copolymer P1 can have a melting enthalpy ranging from about 40 to 80 J/g.

The heterophasic propylene copolymer P1 can have a melting enthalpy ranging from about 20 to 50 J/g.

The propylene homopolymer or copolymer P1 can have a melt flow index ranging from 0.5 to 3 g/10 min, measured at about 230° C. with a load of about 2.16 kg according to ASTM D1238-00.

The random propylene copolymer P1 can have a melt flow index ranging from 1.2 to 2.5 g/10 min, and preferably from 1.5 to 2.5 g/10 min, measured at about 230° C. with a load of about 2.16 kg according to ASTM D1238-00.

The heterophasic propylene copolymer P1 can have a melt flow index ranging from 0.5 to 1.5 g/10 min, and preferably from 0.5 to 1.4 g/10 min, measured at about 230° C. with a load of about 2.16 kg according to ASTM D1238-00.

The polypropylene-based thermoplastic polymer material can comprise several different propylene polymers, such as several different propylene homopolymers P1, at least one propylene homopolymer P1 and at least one propylene copolymer P1, or several different propylene copolymers P1.

The polypropylene-based thermoplastic polymer material preferably comprises at least about 50% by weight, preferably about 55 to 90% by weight, and particularly preferably about 60 to 90% by weight, of propylene polymer(s), based on the total weight of the polypropylene-based thermoplastic polymer material.

When the polypropylene-based thermoplastic polymer material comprises several different propylene copolymers P1, it preferably comprises two different propylene copolymers P1, said propylene copolymers P1 being as defined above.

In particular, the polypropylene-based thermoplastic polymer material can include a random propylene copolymer (as first propylene copolymer P1) and a heterophasic propylene copolymer (as second propylene copolymer P1), or two different heterophasic propylene copolymers.

When the polypropylene-based thermoplastic polymer material comprises a random propylene copolymer and a heterophasic propylene copolymer, said heterophasic propylene copolymer preferably has an elastic modulus ranging from about 600 to 1200 MPa.

According to a specific example, the two heterophasic propylene copolymers have a different elastic modulus. Preferably, the polypropylene-based thermoplastic polymer material comprises a first heterophasic propylene copolymer having an elastic modulus ranging from about 50 to 550 MPa, and particularly preferably ranging from about 50 to 250 MPa; and a second heterophasic propylene copolymer having an elastic modulus ranging from about 600 to 1200 MPa.

Advantageously, the first and second heterophasic propylene copolymers have a melt flow index as defined above.

These combinations of propylene copolymers P1 can advantageously improve the mechanical properties of the electrically insulating layer. In particular, the combination makes it possible to obtain optimized mechanical properties of the electrically insulating layer, in particular in terms of elongation at break and flexibility; and/or form a more homogeneous electrically insulating layer.

According to a preferred example, the propylene copolymer P1 or the propylene copolymers P1 when there are several of them, represent(s) at least about 50% by weight, preferably about 55 to 90% by weight, and more preferably about 60 to 90% by weight, based on the total weight of the polypropylene-based thermoplastic polymer material.

The random propylene copolymer P1 can represent at least about 20% by weight, and preferably about 30 to 70% by weight, based on the total weight of the polypropylene-based thermoplastic polymer material.

The heterophasic propylene copolymer P1, or heterophasic propylene copolymers P1 when there are several of them, can represent from about 5 to 95% by weight, preferably about 50 to 90% by weight, and particularly preferably about 60 to 80% by weight, based on the total weight of the polypropylene-based thermoplastic polymer material.

The polypropylene-based thermoplastic polymer material can further comprise an olefin homopolymer or copolymer P2, the olefin being selected in particular from ethylene and an olefin α3 having the formula CH2=CH—$R_2$, wherein $R_2$ is a linear or branched alkyl group having from 1 to 12 carbon atoms.

Said homopolymer or a copolymer of olefin P2 is preferably different from said propylene homopolymer or copolymer P1.

The olefin α3 is preferably selected from the following olefins: propylene, 1-butene, isobutylene, 1-pentene, 4-methyl-1-pentene, 1-hexene, 1-octene, 1-decene, 1-dodecene, and one of their mixtures.

The olefin α3 that is particularly preferred is 1-butene, 1-hexene, 1-octene or one of their mixtures.

According to an advantageous example, $R_2$ is a linear or branched alkyl group having from 2 to 8 carbon atoms.

The combination of polymers P1 and P2 makes it possible to obtain a thermoplastic polymer material with good mechanical properties, particularly in terms of elastic modulus.

The olefin homopolymer or copolymer P2 is preferably an ethylene polymer.

The ethylene polymer can be a low-density polyethylene polymer, a medium-density polyethylene, or a high-density polyethylene, and preferably a linear low-density polyethylene; in particular according to ISO 1183A (at a temperature of 23° C.).

According to a preferred example, the olefin homopolymer or copolymer P2 represents about 5 to 50% by weight, and more preferably about 10 to 40% by weight, based on the total weight of the polypropylene-based thermoplastic polymer material.

According to a particularly preferred example, notably for medium voltage applications, the polypropylene-based thermoplastic polymer material comprises two propylene copolymers P1, such as a random propylene copolymer and a heterophasic propylene copolymer or two different heterophasic propylene copolymers, and an olefin homopolymer or copolymer P2, such as an ethylene polymer. This combination of propylene copolymers P1 and an olefin homopolymer or copolymer P2 further improves the mechanical properties of the electrically insulating layer, while ensuring good thermal conductivity.

The thermoplastic polymer material preferably comprises at least one propylene polymer having a Vicat temperature of at least 90° C., more preferably of at least 110° C., and even more preferably of at least 130° C. The propylene polymer having such a Vicat temperature is preferably the major polymer in the thermoplastic polymer material.

According to a preferred example, the propylene polymer having such a Vicat temperature is a random copolymer of propylene as defined above.

In the present description, the Vicat temperature, or in other words the Vicat softening point (also known as the Vicat softening temperature) may be readily determined according to the standard ISO 306 Method A (2013).

The thermoplastic polymer material of the insulating polymer composition of the electrically insulating layer is preferably heterophasic (i.e. it comprises several phases). The presence of several phases generally results from the mixing of two different polyolefins, such as a mixture of different propylene polymers or a mixture of a propylene polymer and an ethylene polymer.

The thermoplastic polymer material as defined above represents the polymer material of the insulating polymer composition.

The insulating polymer composition can include a dielectric liquid, in particular forming an intimate mixture with the thermoplastic polymer material. The presence of the dielectric liquid enables to obtain better dielectric properties (i.e. better electrical insulation), and notably better dielectric strength of the insulating layer obtained from the insulating polymer composition. It can also allow improving mechanical properties and/or ageing resistance of said insulating layer.

Examples of dielectric liquids include mineral oils (e.g. naphthenic oils, paraffinic oils or aromatic oils), vegetable oils (e.g. soybean oil, linseed oil, rapeseed oil, corn oil or castor oil) or synthetic oils such as aromatic hydrocarbons (alkylbenzenes, alkylnaphthalenes, alkylbiphenyls, alkydiaryl ethylenes, etc.), silicone oils, ether-oxides, organic esters or aliphatic hydrocarbons.

According to a particular embodiment, the dielectric liquid represents about 1% to 20% by weight, preferably about 2 to 15% by weight, and more preferably about 3 to 12% by weight, based on the total weight of the insulating polymer composition.

The dielectric liquid can include a mineral oil and at least one polar compound of type benzophenone, acetophenone or one of their derivatives.

In this embodiment, the dielectric liquid can comprise at least about 70% by weight of mineral oil, preferably at least about 80% by weight of mineral oil, and particularly preferably at least about 90% by weight of mineral oil based on the total weight of the dielectric liquid.

The mineral oil is generally liquid at about 20-25° C.

The mineral oil can be selected from naphthenic oils and paraffinic oils.

The mineral oil is obtained from the refining of a petroleum crude oil.

According to a particularly preferred embodiment of the invention, the mineral oil comprises a paraffinic carbon (Cp) content ranging from about 45 to 65% atomic, a naphthenic carbon (Cn) content ranging from about 35 to 55% atomic and an aromatic carbon (Ca) content ranging from about 0.5 to 10% atomic.

In a particular embodiment, the polar compound of type benzophenone, acetophenone or one of their derivatives represents at least about 2.5% by weight, preferably at least about 3.5% by weight, and even more preferentially at least about 4% by weight, based on the total weight of the dielectric liquid.

According to a preferred embodiment of the invention, the polar compound of type benzophenone, acetophenone or one of their derivatives is selected from benzophenone, dibenzosuberone, fluorenone and anthrone. Benzophenone is particularly preferred.

System

Another subject matter of the present invention is a system comprising:
   at least one electrical cable, and
   at least one electrical cable accessory surrounding at least one part or end of said electrical cable,
   wherein the electrical cable and/or the electrical cable accessory are/is as defined above.

The electrical cable of the system may comprise at least one elongated electrical conductor, at least one semiconducting layer surrounding said elongated electrical conductor and at least one electrically insulating layer surrounding the semiconducting layer. Optionally, the electrical cable of the system may comprise an additional semiconducting layer surrounding the electrically insulating layer. In this case, the semiconducting layer surrounding the elongated electrical conductor is called "inner semiconducting layer"

and the additional semiconducting layer surrounding the electrically insulating layer is called "outer semiconducting layer".

In a particular embodiment, in the electrical cable of the system, the semiconducting layer is in direct contact with the elongated electrical conductor, the electrically insulating layer is in direct contact with the semiconducting layer, and the additional semiconducting layer is in direct contact with the electrically insulating layer.

Preferably, at least the electrically insulating layer of the electrical cable is obtained from an insulating polymer composition according to the present invention. In particular, the insulating polymer composition comprises a polypropylene-based thermoplastic material.

Alternatively, the electrically insulating layer of these cables is a crosslinked layer.

Preferably, the semiconducting layer of the cable is a thermoplastic layer obtained from a semiconducting polymer composition comprising a thermoplastic polymer material, preferably a polypropylene-based thermoplastic material.

Alternatively, the semiconducting layer of the cable is a at least partially crosslinked layer according to the present invention.

In the system, the electrically insulating layer of the electrical cable and the electrically insulating layer of the cable accessory are preferably obtained from the same insulating polymer composition.

In the system, the semiconducting layer of the electrical cable and the semiconducting layer of the cable accessory are preferably obtained from the same semiconducting polymer composition.

Method for Manufacturing a Cable Accessory

Another subject matter of the present invention is a method for manufacturing an electrical cable or an electrical cable accessory as defined above, comprising the steps of:
 i. applying the crosslinkable semiconducting polymer composition around at least one part or end of at least one electrical cable, notably around an elongated electrical conductor of an electrical cable, or around an electrical connector or electrical conductor joint,
 ii. crosslinking the crosslinkable semiconducting polymer composition by heating to form the semiconducting layer,
 iii. applying the insulating polymer composition comprising a thermoplastic polymer material around the semiconducting layer to form the electrically insulating layer.

In the case of the method for manufacturing an electrical cable, the step (i) may be a step of extruding the crosslinkable semiconducting polymer composition around an elongated electrical conductor of an electrical cable, in order to obtain an extruded layer and step (ii) may be a step of crosslinking the extruded layer of step (i) by heating the extruded layer.

During step (i), the temperature within the extruder should preferably not exceed the temperature at which the crosslinking occurs, for example should preferably not exceed the temperature of opening of the epoxy functional group of the polymer A, in order to prevent any crosslinking within the extruder. By way of example, the temperature for processing the polymer composition by extrusion is less than 200° C., and preferably less than 150° C.

There is thus obtained, at the extruder outlet, a layer extruded around said elongated electrical conductor which may or may not be directly in physical contact with said elongated electrical conductor.

At the extruder outlet, the extruded layer is thus a non-crosslinked layer.

Prior to step (i), the constituent components of the semiconducting polymer composition of the invention can be mixed, in particular with the polymer(s) in the molten state, for example the polymer A in the molten state, in order to obtain a homogeneous mixture. The temperature within the mixer can be sufficient to obtain the polymer(s) in the molten state, for example the polymer A in the molten state, but is limited in order to prevent the crosslinking of the polymer (s), for example limited in order to prevent the opening of the epoxy functional group of the polymer A and thus the crosslinking of the polymer A.

The homogeneous mixture is then granulated by techniques well known to a person skilled in the art. These granules can subsequently feed an extruder in order to carry out step (i).

Step (ii) can be carried out by the thermal route, for example using a steam or nitrogen tube or a bath of molten salt, these techniques being well known to a person skilled in the art. By way of example, the crosslinking temperature is less than 300° C., and preferably less than or equal to 250° C.

At the extruder outlet, the composition extruded in the form of a layer around the elongated electrical conductor can subsequently be subjected to a temperature sufficient to cause the crosslinking of the extruded layer, for example a temperature sufficient in order to be able to open the epoxy functional group of the polymer A, and thus to cause the crosslinking agent B to react with the opened epoxy functional group. An extruded and crosslinked layer is then obtained.

In the case of the method for manufacturing an electrical cable accessory, the step (i) can be carried out by lapping technique, i.e. by lapping a pre-extruded tape. In other words, the crosslinkable semiconducting polymer composition is extruded in the form of a tape, to be helically wound around the electrical cable end of the electrical cable. The thickness of the extruded tape may be between 0.10 mm and 0.45 mm, and preferably between 0.25 mm and 0.30 mm. The width of the extruded tape may be between 13 mm and 18 mm, preferably between 14 mm and 17 mm, and more preferably between 15 mm and 16 mm.

The step (ii) of crosslinking can be carried out at temperatures of at least 70° C., preferably of between 70° C. and 120° C. and preferably of between 80° C. and 100° C.

Alternatively, a temperature of greater than 200° C. at a pressure greater than atmospheric pressure, for a few minutes, can in addition also be used for crosslinking of the crosslinkable semiconducting polymer composition.

The step (ii) enables to give to the semiconducting layer thermal and mechanical stability which will make the layer not deformable during the subsequent heating steps.

During step (iii), the insulating polymer composition is preferably deposited on top of the semiconducting layer by several methods, in particular by lapping technique. For example, the insulating polymer composition is extruded in the form of a tape, to be helically wound around the semiconducting layer. The thickness of the extruded tape may be between 0.30 mm and 0.70 mm, and preferably between 0.45 mm and 0.55 mm. The width of the extruded tape may be between 15 mm and 19 mm, and preferably between 16 mm and 18 mm.

When the cable accessory is a flexible cable joint, the method may comprise, before the step (i), a step of preparing the first electrical end of the first electrical cable and the second electrical end of the second electrical cable for jointing, and then, a step of jointing the elongated electrical conductors of the first and second electrical cables.

During step (i), the crosslinkable semiconducting polymer composition is preferably applied around the jointing of the elongated electrical conductors of the first and second electrical cables.

The method may comprise, between steps (i) and (ii), a step of heating the crosslinkable semiconducting polymer composition above its crystalline point and of molding into a cylinder around the jointing of the elongated electrical conductors of the first and second electrical cables.

The crosslinking step (ii) will give the material thermal and mechanical stability which will make the semiconducting layer not deformable. The electrically insulating layer can then be applied on top of the at least partially crosslinked semiconducting layer.

BRIEF DESCRIPTION OF THE DRAWINGS

The invention may be better understood from the detailed description which follows, of non-limiting embodiments thereof, with reference to the attached drawings, in which.

DETAILED DESCRIPTION

For reasons of clarity, only the components essential for the understanding of the invention have been represented diagrammatically, this being done without observing a scale.

Figure 1:
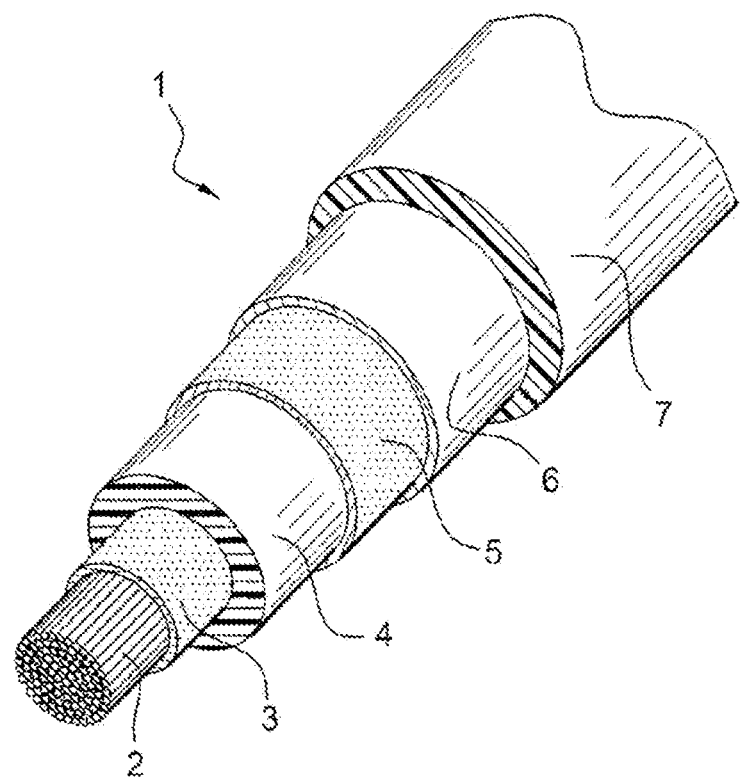
FIG. 1 represents a diagrammatic view in cross section of an example of an electric cable according to the invention.

The medium- or high-voltage electrical cable 1, illustrated in FIG. 1, comprises an elongated electrical conductor 2, in particular made of copper or of aluminum. The electrical cable 1 additionally comprises several layers positioned successively and coaxially around this elongated electrical conductor 2, namely: a first semiconducting layer 3 referred to as "inner semiconducting layer", an electrically insulating layer 4, a second semiconducting layer 5 referred to as "outer semiconducting layer", an earthing and/or protective metal shield 6 and an external protective cladding 7.

The electrically insulating layer 4 is a layer obtained from the insulating polymer composition according to the invention. Preferably, the electrically insulating layer 4 is an extruded layer.

The inner semiconducting layer 3, and optionally the outer semiconducting layer 5, is/are at least partially crosslinked according to the invention. Preferably, the inner semiconducting layer 3, and optionally the outer semiconducting layer 5, is/are an extruded layer(s).

The presence of the metal shield 6 and of the external protective cladding 7 is preferential but not essential, this cable structure being as such well known to a person skilled in the art.

Figure 2:
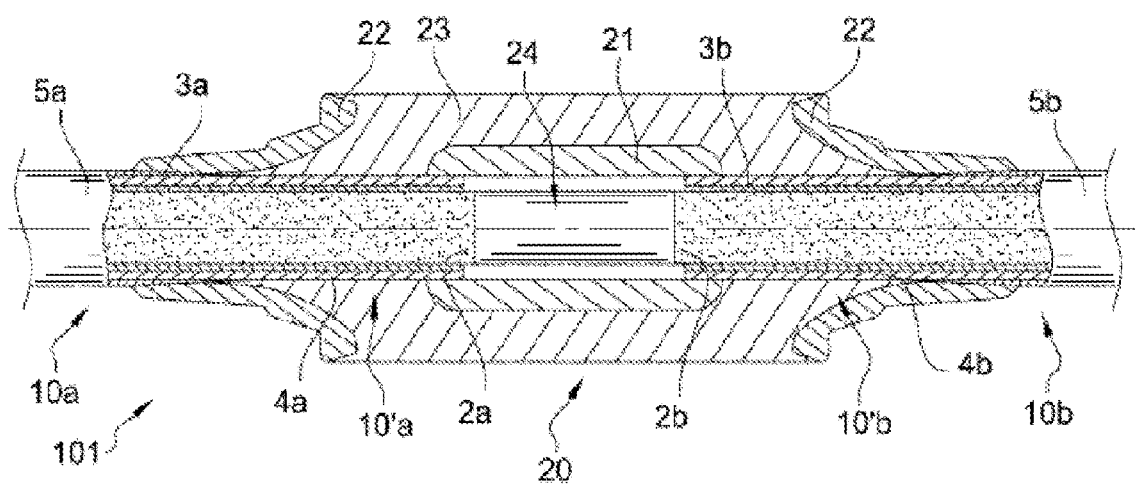
FIG. 2 represents a diagrammatic view of an example of system according to the invention comprising a cable joint, in longitudinal section.

FIG. 2 represents a system 101 comprising a cable joint 20 surrounding, in part, two electrical cables 10*a* and 10*b*.

More particularly, the electrical cables 10*a* and 10*b* respectively comprise electrical cable ends 10'*a* and 10'*b* which are surrounded by the cable joint 20.

The body of the cable joint 20 comprises an inner semiconducting layer 21, which is at least partially crosslinked as described in the present invention, and an outer semiconducting layer 22 separated by an electrically insulating layer 23 which is obtained from an insulating polymer composition comprising a thermoplastic polymer material as described in the present invention. The outer semiconducting layer 22 may be a stress-relief cone.

Said semiconducting layers 21, 22 and said electrically insulating layer 23 surround the electrical cable ends 10'*a* and 10'*b* respectively of the electrical cables 10*a* and 10*b*.

The cable joint 20 makes it possible to electrically connect the first cable 10*a* to the second cable 10*b*, in particular by virtue of an electrical connector 24 positioned at the center of the cable joint 20.

The first electrical cable 10*a* comprises an elongated electrical conductor 2*a*, an inner semiconducting layer 3*a* surrounding and being in direct contact with the elongated electrical conductor 2*a*, an electrically insulating layer 4*a* surrounding and being in direct contact with the inner semiconducting layer 3*a*, and an outer semiconducting layer 5*a* surrounding and being in direct contact with the electrically insulating layer 4*a*.

The second electrical cable 10*b* comprises an elongated electrical conductor 2*b*, an inner semiconducting layer 3*b* surrounding and being in direct contact with the elongated electrical conductor 2*b*, an electrically insulating layer 4*b* surrounding and being in direct contact with the inner semiconducting layer 3*b*, and an outer semiconducting layer 5*b* surrounding and being in direct contact with the electrically insulating layer 4*b*.

These electrical cables 10*a* and 10*b* can be those described in the present invention.

For example, the inner semiconducting layers 3*a*, 3*b*, the electrically insulating layers 4*a*, 4*b* and the outer semiconducting layers 5*a*, 5*b* of the first and second electrical cables 10*a*, 10*b* are preferably each a thermoplastic layer obtained from a polymer composition comprising a thermoplastic material, preferably a polypropylene-based thermoplastic material.

In particular, the electrical cables 10*a* and 10*b* may be medium or high voltage electrical cables.

At the electrical cable ends 10'*a* and 10'*b* respectively of the electrical cables 10*a* and 10*b*, the outer semiconducting layer 5*a*, 5*b* of each cable 10*a*, 10*b* is at least partially denuded in order for the electrically insulating layer 4*a*, 4*b* of each cable 10*a*, 10*b* to be at least partially positioned inside the cable joint 20, without being covered with the outer semiconducting layer 5*a*, 5*b* of each cable 10*a*, 10*b*.

Inside the cable joint 20, the electrically insulating layers 4*a*, 4*b* of each electrical cable 10*a*, 10*b* are directly in contact with the electrically insulating layer 23 and the inner semiconducting layer 21 of the cable joint 20. The outer semiconducting layers 5*a*, 5*b* of each electrical cable 10*a*, 10*b* are directly in contact with the outer semiconducting layer 22 of the cable joint 20.

Figure 3:
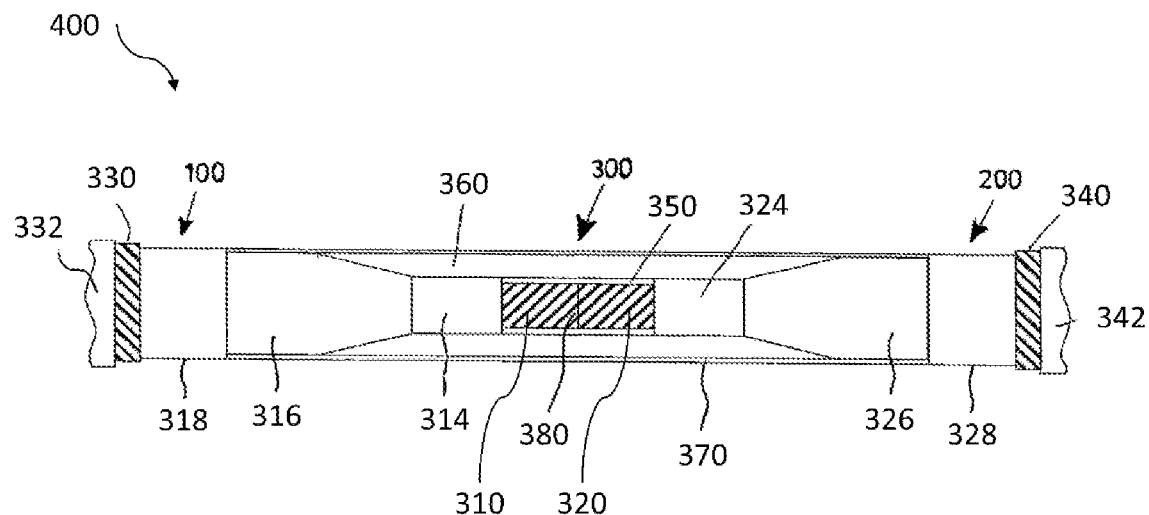
FIG. 3 represents a diagrammatic view of an example of system according to the invention comprising a flexible cable joint, in longitudinal section.

FIG. 3 represents a system 400 comprising a flexible cable joint 300 surrounding, in part, a first electrical cable 100 and a second electrical cable 200.

The first electrical cable 100 and the second electrical cable 200 are placed axially adjacent one to another, so as to be subsequently joined together.

Each cable 100, 200 comprises an elongated electrical conductor 310, 320, an inner semiconducting layer 314, 324 surrounding and being in direct contact with the respective elongated electrical conductor 310, 320, an electrically insulating layer 316, 326 surrounding and being in direct contact with the respective inner semiconducting layer 314, 324, and an outer semiconducting layer 318, 328 surrounding and being in direct contact with the respective electrically insulating layer 316, 326.

The inner semiconducting layers 314, 324, the electrically insulating layers 316, 326 and the outer semiconducting layers 318, 328 of the first and second electrical cables 100, 200 are each a thermoplastic layer obtained from a polymer composition comprising a thermoplastic material, preferably a polypropylene-based thermoplastic material.

Each electrical cable 100, 200 is then sequentially surrounded by a metal screen 330, 340 and by one or more outer jackets 332, 342 made, for example, of polyethylene.

As shown on FIG. 3, the respective terminal portions of the elongated electrical conductors 310, 320 of the first 100 and the second 200 electrical cables are joined, so as to form an electrical conductor joint 380.

The electrical conductor joint 380 can be obtained, for example, through a compression clamp if the elongated electrical conductors 310, 320 are made of copper, or through metal inert gas (MIG) welding if the elongated electrical conductors 310, 320 are made of aluminum.

In FIG. 3, the flexible cable joint 300 for joining together the first electrical cable 100 and the second electrical cable 200 is schematically represented in cross-section. The flexible cable joint 300 comprises an inner semiconducting layer 350 which is at least partially crosslinked as described in the present invention, an electrically insulating layer 360 which is obtained from an insulating polymer composition comprising a thermoplastic polymer material as described in the present invention, and an outer semiconducting layer 370.

The electrical conductor joint 380 is surrounded and in direct contact with the inner semiconducting layer 350 of the flexible cable joint 300, the inner semiconducting layer 350 of the flexible cable joint 300 is surrounded and in direct contact with the electrically insulating layer 360, and the electrically insulating layer 360 of the flexible cable joint 300 is surrounded and in direct contact with the outer semiconducting layer 370.

The electrically insulating layer 360 of the flexible cable joint 300 and the electrically insulating layers 316, 326 of the first and second electrical cables 100, 200 are preferably obtained from the same insulating polymer composition.

The inner semiconducting layer 350, the electrically insulating layer 360 and the outer semiconducting layer 370 are respectively configured for rebuilding the inner semiconducting layers 314, 324, the electrically insulating layers 316, 326 and the outer semiconducting layer 318, 328 of the first electrical cable 100 and the second electrical cable 200.

Each layer 350, 360, 370 of the flexible cable joint 300 can be made in the form of a tape to be helically wound around the elongated electric conductors 310, 320 of the electrical cables 100, 200. Each tape is made of an electrically insulating or semiconducting material chemically compatible with and having substantially the same electrical properties of the corresponding electrically insulating or semiconducting material of the corresponding inner semiconducting layers 314, 324, electrically insulating layers 316, 326 and outer semiconducting layers 318, 328 of the first and second electrical cables 100, 200, so as to restore the cable continuity over the elongated electric conductors 310, 320. Each tape is preferably obtained by extrusion.

As sketched in FIG. 3, the electrically insulating layer 360 of the flexible cable joint 300 has a thickness significantly greater than the thickness of the inner semiconducting layer 350 and outer semiconducting layer 370 of the flexible cable joint 300.

The outer semiconducting layer 370 of the flexible cable joint 300 is finally covered by subsequently rebuilt layers of the metal screen 330, 340 and of the one or more outer jackets 332, 342. The metal screen rebuilding can be performed, for example, with a brazing process, while the outer jackets are usually rebuilt by using polymer (e.g. polyethylene) shrinkable tubes or adhesive tapes.

Figure 4:
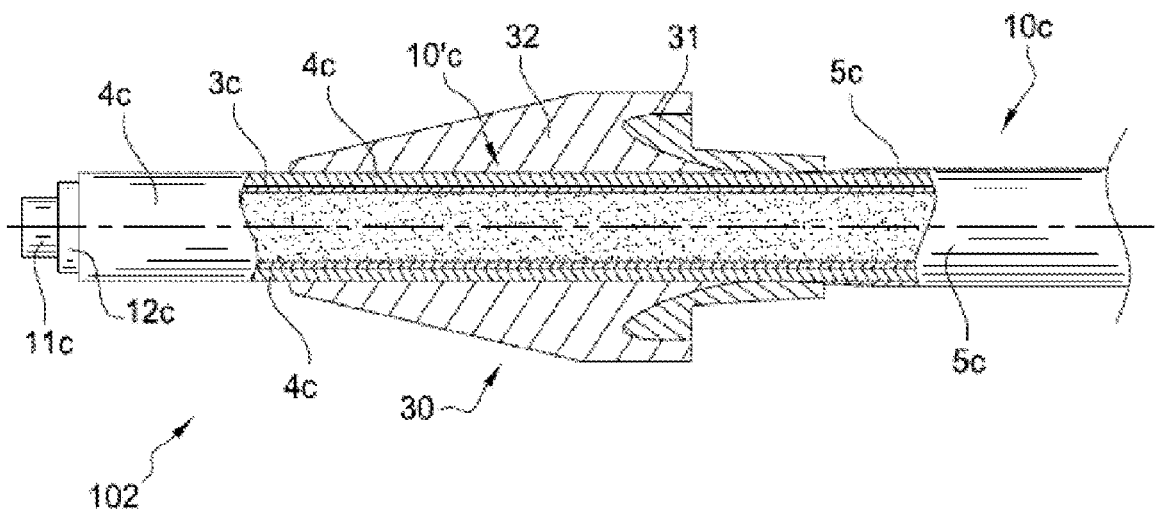
FIG. 4 represents a diagrammatic view of an example of system according to the invention comprising a cable termination, in longitudinal section.

FIG. 4 represents a system 102 comprising a cable termination 30 surrounding a single electrical cable 10c.

More particularly, the electrical cable 10c comprises an electrical cable end 10'c surrounded by the cable termination 30.

The body of the cable termination 30 comprises a semiconducting layer 31 which is at least partially crosslinked as described in the present invention and an electrically insulating layer 32 which is obtained from an insulating polymer composition comprising a thermoplastic polymer material as described in the present invention. The outer semiconducting layer 31 may be a stress-relief cone.

Said semiconducting layer 31 and said electrically insulating layer 32 surround the electrical cable end 10'c of the electrical cable 10c.

The electrical cable 10c comprises an elongated electrical conductor 2c, an inner semiconducting layer 3c surrounding and being in direct contact with the elongated electrical conductor 2c, an electrically insulating layer 4c surrounding and being in direct contact with the inner semiconducting layer 3c, and an outer semiconducting layer 5c surrounding and being in direct contact with the electrically insulating layer 4c.

This electrical cable 10c can be that described in the present invention.

For example, the inner semiconducting layer 3c, the electrically insulating layer 4c and the outer semiconducting layer 5c of the electrical cable 10c are preferably each a thermoplastic layer obtained from a polymer composition comprising a thermoplastic material, preferably a polypropylene-based thermoplastic material.

In particular, the electrical cable 10c may be a medium or high voltage electrical cable.

At the electrical cable end 10'c of the electrical cable 10c, the outer semiconducting layer 5c of the electrical cable 10c is at least partially denuded in order for the electrical insulating layer 4c of the electrical cable 10c to be at least partially positioned inside the cable termination 30, without being covered with the outer semiconducting layer 5c of the electrical cable 10c.

Inside the cable termination 30, the electrically insulating layer 4c of the electrical cable 10c is directly in contact with the electrically insulating layer 32 of the cable termination 30. The outer semiconducting layer 5c of the electrical cable 10c is directly in contact with the semiconducting layer 31 of the cable termination 30.

EXAMPLES

Example A

The crosslinkable semiconducting polymer composition according to the first alternative embodiment:
Polymer (A): 100
Non-polymeric crosslinking agent (B): 0.38
Antioxidants: 1.5
Carbon black: 42.9
The amounts of the compounds above are expressed in parts by weight per 100 parts by weight of polymer, the polymer in this instance being solely polymer (A).

Polymer (A) is a copolymer of ethylene and of glycidyl methacrylate (GMA) sold by Arkema under the reference Lotader AX8840, this copolymer comprising 8% by weight of GMA;

Non-polymeric crosslinking agent (B) is an amino acid named 11-aminoundecanoic acid sold by Sigma-Aldrich under the reference 11-Aminoundecanoic acid;

Antioxidants is a mixture of 0.5 part by weight of Irganox PS802 and of 1.0 part by weight of Irganox 1035, these antioxidants being sold by BASF; and Carbon black is carbon black sold by Cabot under the reference Carbon Black VXC500.

In a first step, the carbon black is first of all mixed with the polymer (A) in the molten state in an internal mixer of twin-screw or Buss type, and then the non-polymeric crosslinking agent (B) and the antioxidants are incorporated in said mixture. The addition of the non-polymeric crosslinking agent (B) in a stage separate from and subsequent to the addition of the carbon black makes it possible to prevent any premature crosslinking of the polymer composition which may occur subsequent to the rise in temperature brought about by the addition of the carbon black. The non-polymeric crosslinking agent (B) is thus added to the carbon black-comprising mixture once the mixture has cooled to a temperature of less than 130° C. The homogeneous mixture thus obtained is subsequently granulated.

In a second step, the granules are subsequently introduced into a single-screw extruder and extruded at a maximum temperature of 130° C., in order to prevent any crosslinking of the polymer (A) in the extruder. The extrusion is carried out in order to obtain an extruded tape.

The extruded tape is a noncrosslinked semiconducting layer.

When the cable accessory is a flexible cable joint, the tape is then helically wounded around the jointing of the elongated electrical conductors of a first and a second electrical cables.

In a third step, the extruded tape is crosslinked by supplying heat, at a temperature between 150° C. and 200° C., for example 170° C., said electrical cable being passed inside a nitrogen tube under a nitrogen pressure of around 7-10 bar. A at least partially crosslinked semiconducting layer is thus obtained.

Finally, an insulating polymer composition comprising a thermoplastic polymer material, notably a polypropylene-based thermoplastic material, is applied around the at least partially crosslinked semiconducting layer to form the electrically insulating layer.

Example B

The crosslinkable semiconducting polymer composition according to the first alternative embodiment:
a copolymer of ethylene and of glycidyl methacrylate, with less than 10% by weight of glycidyl methacrylate monomer relative to the total weight of the copolymer (polymer (A)),
a copolymer of ethylene and of acrylic acid, with less than 10% by weight of acrylic acid monomer relative to the total weight of the copolymer (polymeric crosslinking agent (B)), and
a copolymer of propylene (olefin polymer C), with the weight of (polymer (A)+polymeric crosslinking agent (B)) is at most 30%, preferably at most 25%, relative to the weight of (polymer (A)+polymeric crosslinking agent (B)+olefin polymer C), and with the content of polymer (A) and of polymeric crosslinking agent (B) is chosen so that 1 epoxy functional group of polymer (A) reacts with 1 carboxyl functional group of polymeric crosslinking agent (B).

Example C

The crosslinkable semiconducting polymer composition according to the second alternative embodiment may comprise:
55-98% by weight of olefin polymer (D),
0.2-20% by weight of crosslinking agent (E),
0-4% by weight of a crosslinking catalyst,
8-40% by weight of an electrically conducting filler of the carbon black type or 0-5% by weight of carbon nanotubes,
0-5% by weight of an antioxidant,
0-20% by weight of a dielectric liquid, and
0-5% by weight of agent which modifies the crosslinking rate.

The amounts of the compounds above are expressed as percentages (%) by weight in the polymer composition.

The polymer matrix in this polymer composition comprises a single olefin polymer (D).

The olefin polymer (D) can be chosen from:
a copolymer of ethylene and of methacrylic acid sold by DuPont under the reference Nucrel® 0910. This copolymer comprises approximately 8.6% by weight of carboxyl functional groups, has a melting point (i.e., molten state) of the order of 100° C. and has a melt flow index of 10 in grams/10 minutes, according to Standard ASTM D 1238 at 190° C./2.16 kg;
a copolymer of ethylene and of acrylic acid sold by Dow under the reference Primacor® 3150. This copolymer comprises approximately 3.0% by weight of carboxyl functional groups, has a melting point (i.e., molten state) of the order of 104° C., and has a melt flow index of 11 in grams/10 minutes, according to Standard ASTM D 1238 at 190° C./2.16 kg;
a copolymer of ethylene and of acrylic acid sold by Dow under the reference Primacor® 3340. This copolymer comprises approximately 6.5% by weight of carboxyl functional groups, has a melting point (i.e., molten state) of the order of 101° C. and has a melt flow index of 9 in grams/10 minutes, according to Standard ASTM D 1238 at 190° C./2.16 kg;
a copolymer of ethylene and of acrylic acid sold by Dow under the reference Primacor® 3440. This copolymer comprises approximately 9.7% by weight of carboxyl functional groups, has a melting point (i.e., molten state) of the order of 98° C. and has a melt flow index of 10 in grams/10 minutes, according to Standard ASTM D 1238 at 190° C./2.16 kg.

The crosslinking agent (E) is the crosslinking agent 1,3-PBO having a melting point of the order of 148° C.

The crosslinking catalyst is a crosslinking catalyst of the DBTL type sold by Solvay Padanaplast under the reference Catalyst CT/5.

In a first step, the crosslinking agent (E) is mixed with the olefin polymer (D) in the molten state in a single-screw extruder of Brabender type. The length of the screw is 475 mm and its diameter is 19 mm (i.e., L=25D). The temperature within the extruder is comprised between 145 and 186° C., preferably between 145 and 168° C. The extrusion rate is comprised between 1.03 and 1.07 m/min.

The composition according to Example C is extruded in the form of a tape according to the extrusion parameters mentioned above. The thickness of the extruded tape is between 0.25 mm and 0.30 mm and the width of the extruded tape is between 15 mm and 16 mm.

The extruded tape is a noncrosslinked semiconducting layer. Indeed, at the outlet of the extruder, the extruded tape is not crosslinked and has a gel content, according to Standard ASTM D2765-01 with extraction with xylene, of at most 20%, preferably at most about 15%, particularly preferably at most about 10%, more particularly preferably at most about 5%, and even more particularly preferably 0%.

When the cable accessory is a flexible cable joint, the extruded tape is then helically wounded around the jointing of the elongated electrical conductors of a first and a second electrical cables.

Then, the extruded tape is crosslinked by supplying heat in order to obtain a at least partially crosslinked semiconducting layer.

According to a first alternative form, the extruded tape is crosslinked at a temperature of at least 90° C. for several hours, in particular for 24 hours. More particularly, the extruded tape is crosslinked at 95° C. for 6 hours and then at 115° C. for 18 hours, at atmospheric pressure, using a standard oven sold by Heraeus.

According to a second alternative form, the extruded tape is crosslinked at a temperature of 70° C. for several hours, in particular for 117 hours, at atmospheric pressure, using a standard oven sold by Heraeus.

According to a third alternative form, the extruded tape is crosslinked at a temperature between 150° C. and 200° C., for example 170° C., for several minutes, in particular for 5 minutes. More particularly, the extruded tape is crosslinked at a temperature between 150° C. and 200° C., for example 170° C., under 0 bar for 3 minutes and then at a temperature between 150° C. and 200° C., for example 170° C., under 10 bar for 2 minutes, using a conventional heating press. They are subsequently cooled under 10 bar for 2 minutes.

Finally, an insulating polymer composition comprising a thermoplastic polymer material, notably a polypropylene-based thermoplastic material, is applied around the at least partially crosslinked semiconducting layer to form the electrically insulating layer.

The invention claimed is:

1. An electrical cable or electrical cable accessory, comprising:
at least one semiconducting layer; and
at least one electrically insulating layer, at least partially in direct contact with the semiconducting layer,
wherein the at least one electrically insulating layer is a non-crosslinked layer obtained from an insulating polymer composition comprising a thermoplastic polymer material, and the at least one semiconducting layer is at least partially crosslinked.

2. The electrical cable or electrical cable accessory according to claim 1, wherein the semiconducting layer is obtained from a crosslinkable semiconducting polymer composition substantially free of peroxides and/or azides.

3. The electrical cable or electrical cable accessory according to claim 1, wherein the crosslinkable semiconducting polymer composition comprises: at least one polymer (A) having at least one epoxy functional group, and a crosslinking agent (B) having at least one reactive functional group capable of reacting with the epoxy functional group of the polymer (A) in order to allow the crosslinking of the polymer (A).

4. The electrical cable or electrical cable accessory according to claim 3, wherein the crosslinking agent (B) comprises at least one reactive functional group selected from a carboxyl functional group and/or precursor thereof and/or derivative thereof, an amine functional group and/or precursor thereof and/or derivative thereof, and a hydrazide functional group and/or precursor thereof and/or derivative thereof.

5. The electrical cable or electrical cable accessory according to claim 4, wherein the crosslinking agent (B) comprises at least one carboxyl functional group and/or precursor thereof and/or derivative thereof.

6. The electrical cable or electrical cable accessory according to claim 5, wherein the crosslinking agent (B) is a copolymer of olefin and of a monomer carrying the carboxyl functional group and/or precursor thereof and/or derivative thereof, notably a copolymer of ethylene and of acrylic or methacrylic acid, or a copolymer of propylene and of maleic anhydride, or a copolymer of propylene and of terbutyl or methyl acrylate.

7. The electrical cable or electrical cable accessory according to claim 6, wherein the weight of the monomer carrying the carboxyl functional group and/or precursor thereof and/or derivative thereof in the copolymer is below 15%.

8. The electrical cable or electrical cable accessory according to claim 5, wherein the content of polymer (A) and of crosslinking agent (B) is chosen so that 1 epoxy functional group of polymer (A) reacts with 1 carboxyl functional group or precursor thereof or derivative thereof of crosslinking agent (B).

9. The electrical cable or electrical cable accessory according to claim 3, wherein the crosslinking agent (B) is a non-polymeric compound.

10. The electrical cable or electrical cable accessory according to claim 9, wherein the crosslinking agent (B) is selected from monoamine, including 1-tetradecylamine (TDA), diamine, including 1,8-diaminooctane (DAO) or N,N'-dimethyl-1,8-octanediamine (DMAO), monocarboxylic acid, dicarboxylic acid, including 1,10-decanedicarboxylic acid (DDA), amino acid, including 11-aminoundecanoic acid, monohydrazide, including octanoic hydrazide (OAD), dihydrazide, including adipic acid dihydrazide (AAD), bisphenol, including 2,2-bis(4-hydroxy-3-methylphenyl) propane (BHMP), acid anhydride, including dodecenylsuccinic anhydride, one of the above mentioned compounds in combination with a transition metal catalyst, including titanium (IV) 2-ethylhexyloxide, or titanium (IV) isopropoxide, or titanium (IV) ethoxide or similar, and mixtures thereof.

11. The electrical cable or electrical cable accessory according to claim 3, wherein the crosslinking agent (B) is a polymeric compound.

12. The electrical cable or electrical cable accessory according to claim 11, wherein the crosslinking agent (B) is a polyetheramine, including a trimethylolpropane tris[poly (propylene glycol) amine terminated] ether (TMPTA).

13. The electrical cable or electrical cable accessory according to claim 11, wherein the crosslinking agent (B) is an olefin polymer, notably a polyethylene or polypropylene.

14. The electrical cable or electrical cable accessory according to claim 3, wherein the polymer (A) is an olefin polymer, including a polyethylene or polypropylene.

15. The electrical cable or electrical cable accessory according to claim 14, wherein the polymer (A) is a copolymer of olefin and of a monomer carrying the epoxy functional group, including a copolymer of ethylene and of glycidyl methacrylate or acrylate.

16. The electrical cable or electrical cable accessory according to claim 15, wherein the weight of the monomer carrying the epoxy functional group in the copolymer is below 15%.

17. The electrical cable or electrical cable accessory according to claim 3, wherein the crosslinkable semiconducting polymer composition further comprises at least an olefin polymer (C) having a melting point temperature greater than 120° C.

18. The electrical cable or electrical cable accessory according to claim 17, wherein the olefin polymer (C) is selected from polyethylene, including high-density polyethylene (HDPE), medium-density polyethylene (MDPE) and low-density polyethylene (LDPE), polypropylene, copolymers thereof, thermoplastic elastomers (TPEs), including thermoplastic polyolefins (TPOs), and mixtures thereof.

19. The electrical cable or electrical cable accessory according to claim 17, wherein the weight of (polymer (A)+crosslinking agent (B)) is at most 30%, relative to the weight of (polymer (A)+crosslinking agent (B)+olefin polymer (C)).

20. The electrical cable or electrical cable accessory according to claim 17, wherein the weight of (polymer (A)+crosslinking agent (B)) is at least 1%, relative to the weight of (polymer (A)+crosslinking agent (B)+olefin polymer (C)).

21. The electrical cable or electrical cable accessory according to claim 1, wherein the crosslinkable semiconducting polymer composition comprises: at least one olefin polymer (D), and a crosslinking agent (E) having at least one oxazoline functional group, the olefin polymer (D) having at least one reactive functional group capable of reacting with the oxazoline functional group of the crosslinking agent (E) in order to allow the crosslinking of the polymer (D).

22. The electrical cable or electrical cable accessory according to claim 1, wherein the insulating polymer composition comprises a polypropylene-based thermoplastic material.

23. The electrical cable accessory according to claim 1, wherein said cable accessory is an electrical cable joint.

24. The electrical cable accessory according to claim 1, wherein said cable accessory is an electrical cable termination.

25. A system, comprising:
at least one electrical cable; and
at least one electrical cable accessory surrounding at least one part or end of said electrical cable,
wherein the at least one electrical cable and/or the at least one electrical cable accessory is as defined in claim 1.

26. The system according to claim 25, wherein the at least one electrical cable and the at least one electrical cable accessory each comprises an electrically insulating layer, and wherein the electrically insulating layer of the at least one electrical cable and the at least one electrical cable accessory are obtained from a same insulating polymer composition.

27. The system according to claim 25, wherein the at least one electrical cable and the at least one electrical cable accessory each comprises a semiconducting layer, and wherein the semiconducting layer of the at least one electrical cable and the at least one electrical cable accessory are obtained from a same semiconducting polymer composition.

28. A method for manufacturing an electrical cable or an electrical cable accessory according to claim 1, comprising:
applying the crosslinkable semiconducting polymer composition around at least one part or end of at least one electrical cable, including around an elongated electrical conductor of an electrical cable, or around an electrical connector or electrical conductor joint;
crosslinking the crosslinkable semiconducting polymer composition by heating to form the semiconducting layer; and
applying the insulating polymer composition comprising a thermoplastic polymer material around the semiconducting layer to form the non-crosslinked electrically insulating layer.

29. The electrical cable or electrical cable accessory according to claim 1, wherein the semiconducting layer is devoid of deformation from the construction of the at least one electrically insulating layer.

* * * * *